United States Patent [19]

Sugiyama et al.

[11] Patent Number: 5,511,423
[45] Date of Patent: Apr. 30, 1996

[54] ULTRASONIC DIAGNOSTIC APPARATUSES AND METHODS THEREFOR

[75] Inventors: Takashi Sugiyama; Jun Kubota, both of Nagareyama, Japan

[73] Assignee: Hitachi Medical Corporation, Tokyo, Japan

[21] Appl. No.: 273,429

[22] Filed: Jul. 11, 1994

[30] Foreign Application Priority Data

Jul. 13, 1993  [JP]  Japan .................................. 5-195251
Jul. 13, 1993  [JP]  Japan .................................. 5-195252

[51] Int. Cl.$^6$ ................................................ G01N 29/00
[52] U.S. Cl. ....................... 73/602; 364/581; 364/413.25
[58] Field of Search ............................. 73/602, 620, 621,
73/624, 625, 626; 367/7, 62, 103; 128/661.01,
662.02; 364/413.25, 581

[56] References Cited

U.S. PATENT DOCUMENTS 4,224,829  9/1980  Kawabuchi ............................... 73/626
4,688,430  8/1987  Anderson .................................. 73/625

Primary Examiner—Hezron E. Williams
Assistant Examiner—Christine K. Oda
Attorney, Agent, or Firm—Antonelli, Terry, Stout & Kraus

[57] ABSTRACT

An ultrasonic diagnostic apparatus which improves the bearing resolution by dynamically changing the weighting performed on the amplitude of transmitted ultrasonic waves and/or a received wave signal. This weighting is changed with reference to the magnitude of the received wave signal. The resolution in the bearing direction is improved by increasing the wave number of the ultrasonic wave to be transmitted and by weighting the ultrasonic wave, whereas the resolution in the distance direction is prevented from being degraded as much as possible, thus making the bearing resolution substantially equal to the distance resolution. Since controlling the wave number is comparable to control of a frequency band, similar effects can also be produced by combining the control of the frequency band of a received wave signal with the weighting.

17 Claims, 23 Drawing Sheets

BEARING DIRECTION

BEARING RESOLUTION

DISTANCE DIRECTION

DISTANCE RESOLUTION

WEIGHTING FUNCTION
(RECTANGULAR)

BEARING DIRECTION
DISTANCE

WEIGHTING FUNCTION
(GAUSSIAN CURVE)

BEARING DIRECTION
DISTANCE

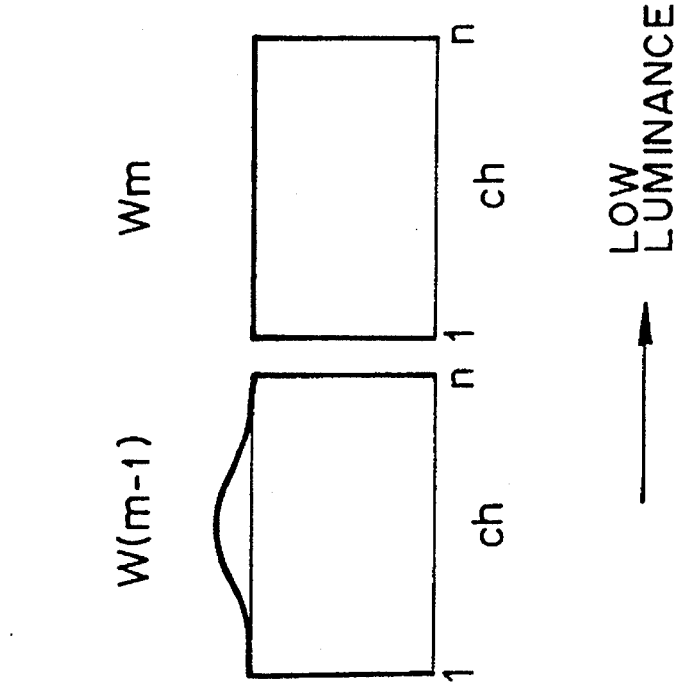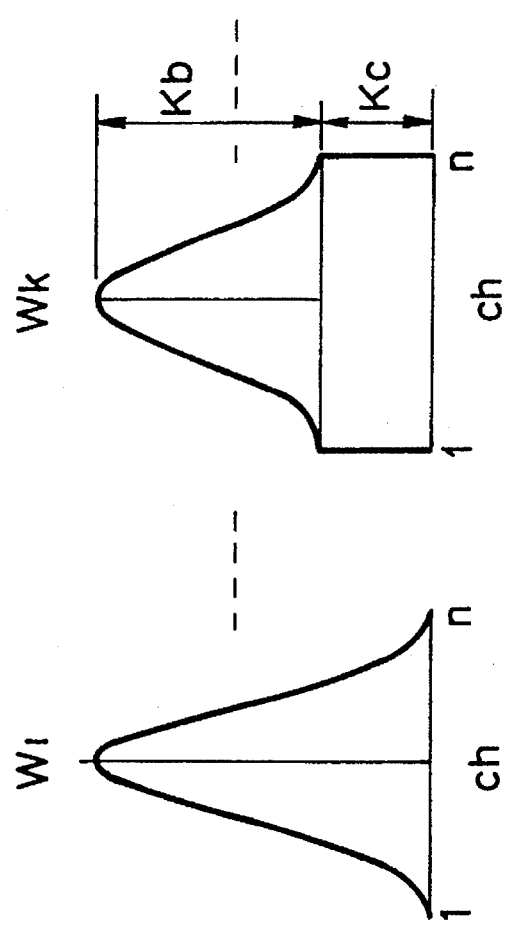

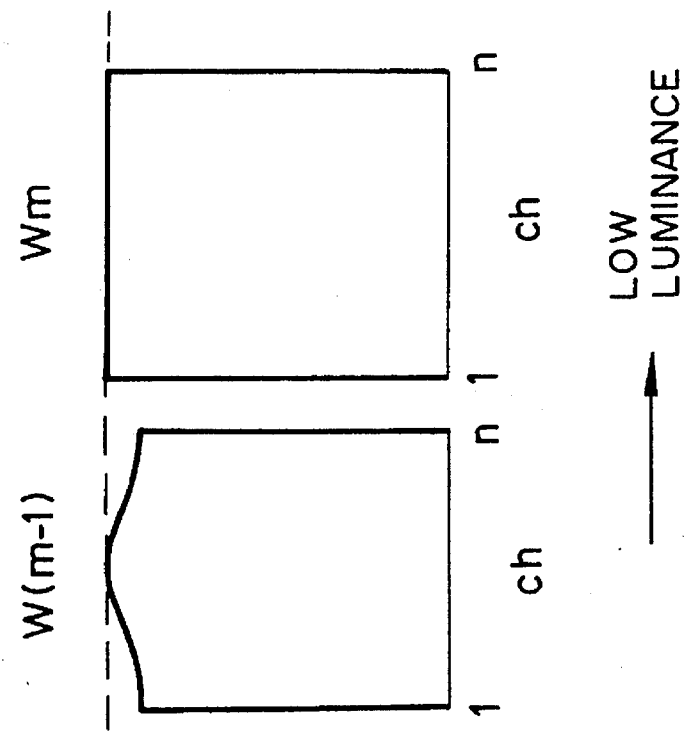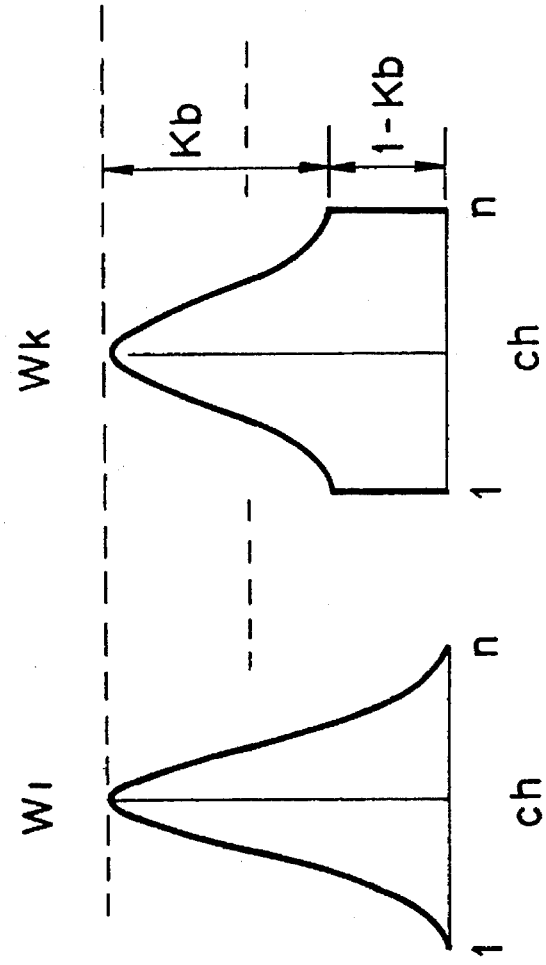

FIG. 21C  NOT WEIGHTED, WAVE NUMBER = 8
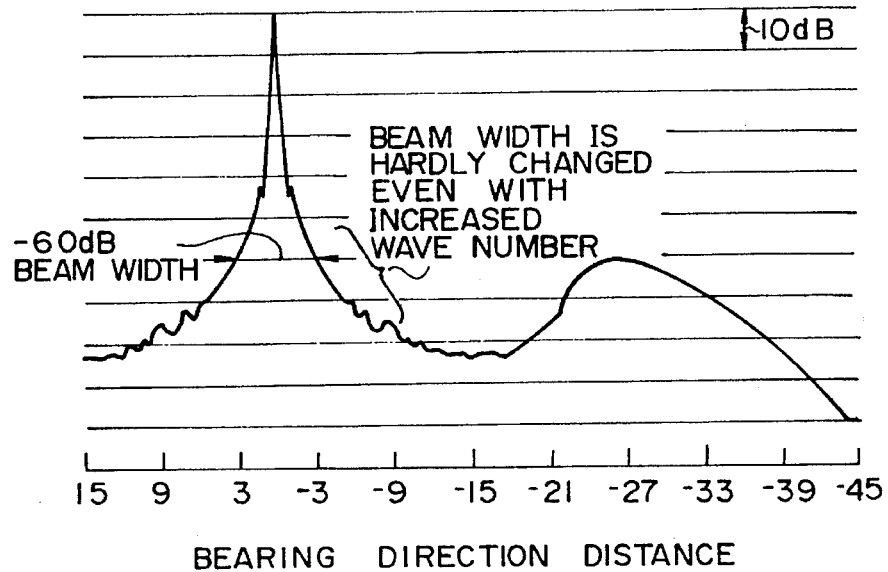
FIG. 21D  WEIGHTED, WAVE NUMBER = 3
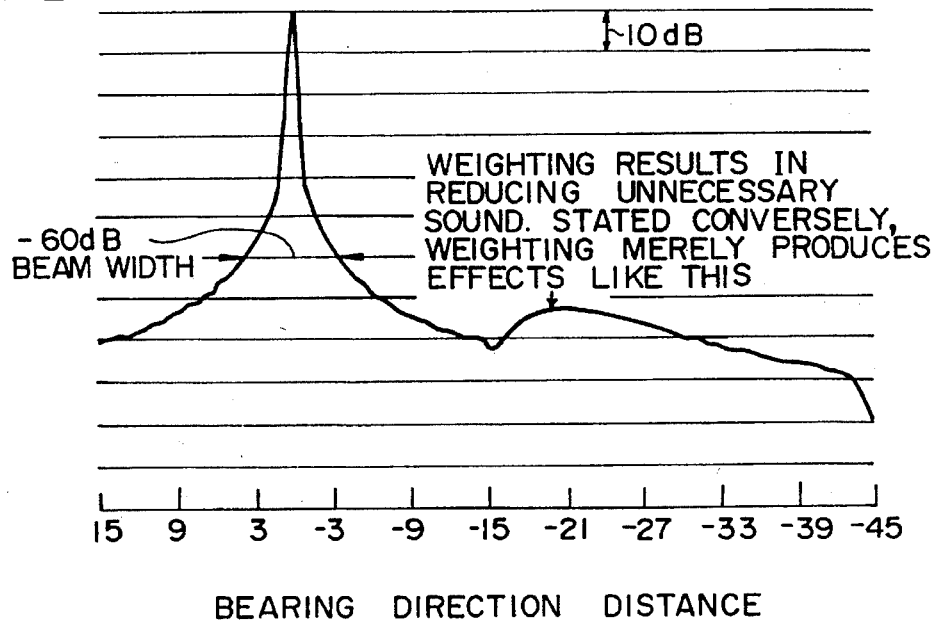

FIG. 22A
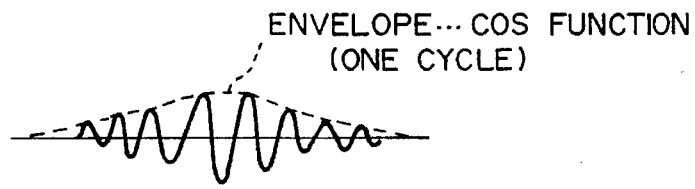
WAVE NUMBER OF
TRANSMITTED WAVE: EIGHT
FIG. 22B
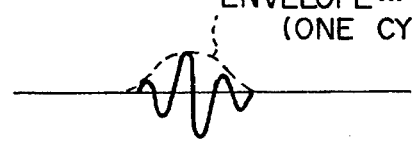
WAVE NUMBER OF
TRANSMITTED WAVE: THREE
FIG. 23
| | WEIGHTING FUNCTION | WAVE NUMBER :THREE | WAVE NUMBER :EIGHT |
|---|---|---|---|
| NOT WEIGHTED | ▯ (1, 0 to 64CH) | 7 mm | 6 mm |
| WEIGHTED (SAME WEIGHTING FUNCTION APPLIED TO TRANSMITTED WAVE AND RECEIVED WAVE) | COS FUNCTION ONE CYCLE (1, 0 to 64CH) | 7 mm | 2 mm |

ULTRASONIC DIAGNOSTIC APPARATUSES AND METHODS THEREFOR

BACKGROUND OF THE INVENTION

The present invention relates to ultrasonic diagnostic apparatuses and methods therefor.

A conventional ultrasonic diagnostic apparatus of this type has, as shown in FIG. 1, a transmission/reception means (1, 2, 3) for transmitting an ultrasonic pulse signal or ultrasonic continuous wave into a body under inspection; a reception means (1,4, 5) for receiving a reflected wave from a region to be diagnosed of the body under inspection and amplifying the received wave to generate a received wave signal; a focusing circuit (6, 7) coupled to receive the received wave signal amplified by the reception means for converging beams; a post-processing circuit (8) for compressing the received wave signal from the focusing circuit and detecting an envelope of the received wave signal; an image processing means (9, 10, 11) coupled to receive an output signal from the post-processing circuit 8 for converting this output signal from an analog form to a digital form and performing processing on the digital signal for displaying an image represented by this digital signal; and a display means (12, 13) coupled to receive an image signal from the image processing means for displaying an image represented by the received image signal. The apparatus of FIG. 1 is also provided with one or both of a transmitted wave weighting means for changing the amplitude or the like of transmitted pulses for each channel or for a unit of plural channels and a received wave weighting means for changing the amplitude of received wave signals. In FIG. 1, reference numeral 14 designates a frequency calculator constituting part of the image processing means coupled to receive an image signal representing an ultrasonic tomographic image from an image memory 11 for displaying the relationship between the luminance of the image signal in a region specified by the operator on a displayed still image and its frequency, and so on, for example, in graphical representation; and 15 a controller for controlling the operations of the respective components of the apparatus. This frequency calculator 14 is used to quantitatively display the ratio of characterizing points (points indicating lesions or the like) in a specified region, thus aiding the operator in performing diagnosis.

In FIG. 1, the received wave weighting means only is shown as the weighting means. This received wave weighting means is a weighting function generator 16 which receives a signal outputted from the controller 15 for switching the transmitter/receiver 1 in accordance with a depth, for example, and reads one of previously stored weighting functions corresponding to the kind of a selected transmitter/receiver 1. The weighting function generator 16 is composed of a storage means such as ROM for storing weighting functions therein and a latch for holding data for distributing a read weighting function to respective channels of received wave signals. A weighting function outputted from the weighting function generator 16 is converted into an analog signal by a D/A convertor (DAC) 17, and then delivered to pre-amplifiers 5 of the respective channels for amplifying received wave signal. Examples of conventional ultrasonic diagnostic apparatus having a transmitted or received wave weighting function are described in JP-A-3-222945, and JP-A-3-261466. It should be repeatedly noted that in conventional examples, a weighting function has previously been determined in accordance with the type of an employed transmitter/receiver.

SUMMARY OF THE INVENTION

It is an object of the present invention to provide an ultrasonic diagnostic apparatus and an associated method which can improve a resolution in a bearing direction by dynamically selecting a preferred weighting function, thereby producing images with good contrast.

The "bearing direction" herein used refers to the direction perpendicular to the transmitted direction of an ultrasonic wave from a transmitter/receiver 1 as shown in FIG. 3A. On the other hand, the resolution in the direction in which the ultrasonic wave propagates is called the "distance resolution" (see FIG. 4A).

The present invention refers to the magnitude of a reflected wave from a region to be diagnosed of a body under inspection. In a preferred embodiment, the magnitude of a received wave signal or the magnitude of a signal on an image is referred to for dynamically selecting a preferred weighting function. It is a received or/and transmitted wave that is subjected to the weighting.

It is another object of the present invention to substantially eliminate distortions in an ultrasonic wave image by making substantially equal the bearing resolution and the distance resolution of the ultrasonic wave image.

The present inventors found, after repetitively concentrating their energies on the studies for achieving the above object, that the bearing resolution was made substantially equal to the distance resolution by appropriately weighting a transmitted ultrasonic wave and adjusting a wave number thereof. It should be noted that adjustment of the wave number of a transmitted ultrasonic wave equals adjustment of the frequency band of the transmitted ultrasonic wave. It can be thought that the bearing resolution is made Substantially equal to the distance resolution also by weighting a transmitted ultrasonic wave and/or received ultrasonic wave and adjusting the frequency band of the received ultrasonic wave.

Behaviors of ultrasonic waves to an organism 100, which is a body under inspection, will be explained with reference to FIGS. 2–4.

In FIG. 2, a transmitter/receiver 1 is brought into contact with the organism 100 to emit ultrasonic waves 103-1–103-n from respective vibrators 101-1–101-n of the transmitter/receiver 1 at predetermined timings. The ultrasonic waves 103-1–103-n are synthesized at a focus 105 to form an acoustic pattern 107 in substantially an X shape which has a cross point at the focus 105, as illustrated. The magnitude distribution of the acoustic pattern 107 in the bearing direction is as shown in FIG. 3B. When an image is formed using a signal range from a maximum value to, for example, −60 dB of the magnitude distribution, the resolution in the bearing direction is determined to be twice the indicated distance $x_1$ ($x_1*2$).

The resolution in the distance direction is determined to be twice the indicated distance $y_1$($y_1*2$) when an image is formed using a signal range from a maximum value to, for example, −60 dB of the envelope. The distance resolution is inversely proportional to the wave number of an emitted ultrasonic wave. This will be understood from the fact that the wavelength of the envelope is shorter as the wave number is smaller. It has therefore been believed that the wave number of an ultrasonic wave generally ranges from one to three in order to enhance the bearing resolution.

In general ultrasonic diagnostic apparatuses, the ratio of the bearing resolution to the distance resolution ($x_1$:$y_1$) has been 10–15:1. With an apparatus having such resolutions, however, a circular object is observed to be an elliptic object on the screen. For precise diagnosis, a technique for observing a circular object as it is on the screen, that is, a technique for providing the ratio of the bearing resolution to the distance resolution being substantially 1:1 has been strongly required in this industrial field.

To achieve this technique, the enhancement of the bearing resolution has conventionally drawn attention. The present inventors, in contrast with this common tendency, tried to increase the wave number of an emitted ultrasonic wave at the cost of the distance resolution. Of course, if the wave number of an ultrasonic wave was increased 10–15 times larger than an ordinary wave number, the ratio of the bearing resolution to the distance resolution ($x_1:y_1$) would be substantially 1:1. However, an apparatus having such low resolutions is not practical.

The present inventors, nevertheless, found that the ratio approached to 1:1 when the wave number of an emitted ultrasonic wave was increased, and in addition the ultrasonic wave was appropriately weighted. It should be noted for reference that either the increase in the wave number of the emitted ultrasonic wave or the weighting of the emitted ultrasonic wave did not result in a preferable ratio ($x_1:y_1$).

The wave number of an emitted ultrasonic wave preferably ranges from five to ten. More preferably, the number should be between six and eight. An ordinary function may be employed for the weighting. For example, a cosine curve, Gaussian curve, or the like may be employed as the weighting function. The weighting function may also be dynamically changed in accordance with another aspect of the present invention as described earlier.

BRIEF DESCRIPTION OF THE DRAWINGS

These and other objects and technical advantages of the present invention will be readily apparent from the following description of the preferred exemplary embodiments of the invention in conjunction with the accompanying drawings, in which:

FIGS. 15A–15D shows examples of weighting functions which provide a high bearing resolution even with a weak signal;

FIGS. 16A–16D show examples of weighting functions which provide a wide dynamic range;

FIGS. 21B–21D show directional functions of examples for comparison;

FIGS. 22A and 22B show waveforms of emitted ultrasonic waves;

FIG. 23 shows a beam width (−60 dB) of directional functions and the shapes of weighting functions;

DESCRIPTION OF THE PREFERRED EMBODIMENTS

Embodiments of the present invention will hereinafter be described in detail with reference to the accompanying drawings.

First Embodiment

Figure 5:
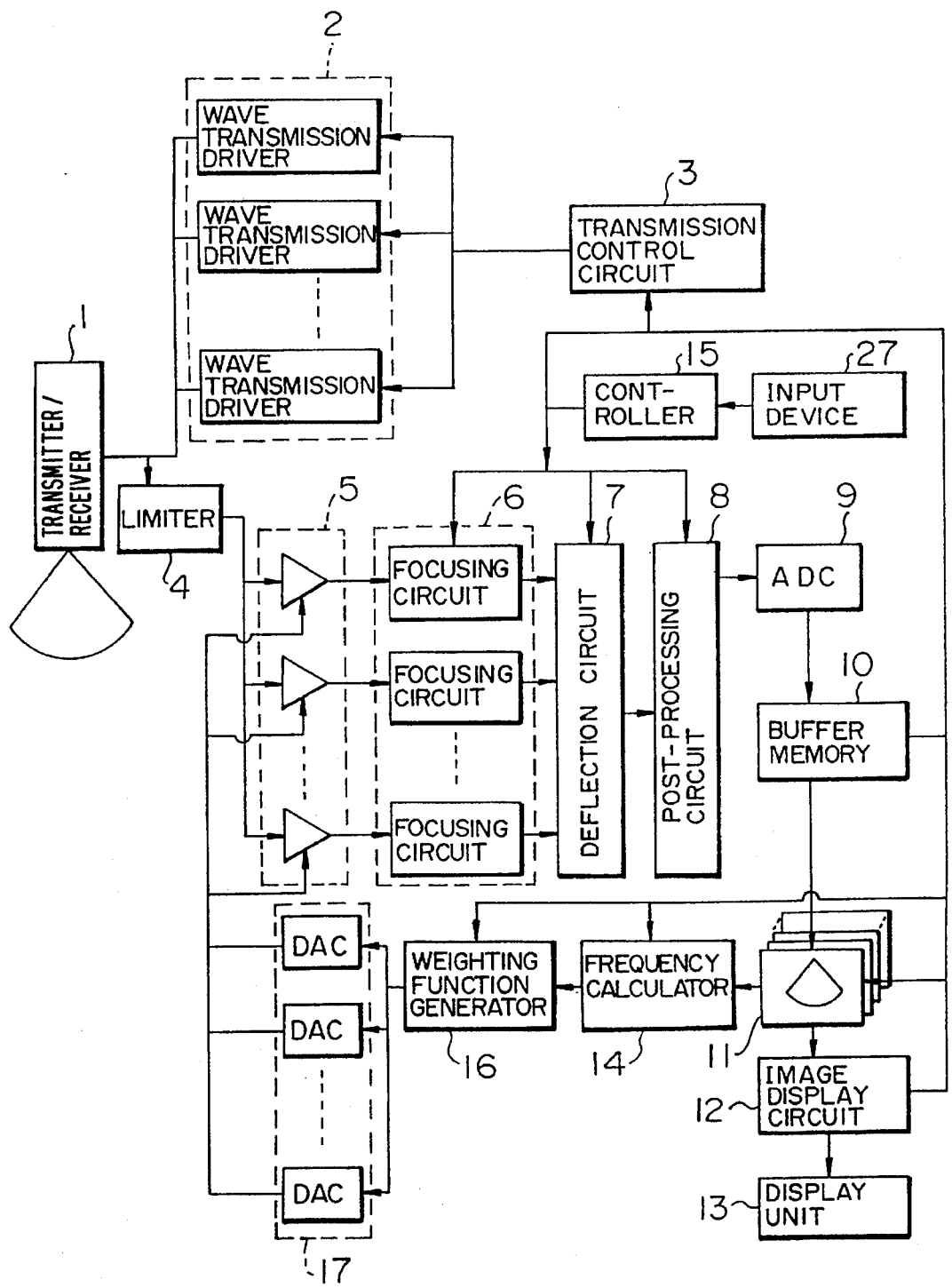
FIG. 5 is a block diagram showing the configuration of an ultrasonic diagnostic apparatus according to a first embodiment of the present invention.

FIG. 5 is a block diagram showing a first embodiment of an ultrasonic diagnostic apparatus. This ultrasonic diagnostic apparatus utilizes ultrasonic waves to produce a tomographic image of a region to be diagnosed in a body under inspection, and performs so-called weighting on transmitted and received ultrasonic waves.

In FIG. 5, a transmitter/receiver 1, for example, transmits ultrasonic waves into a body under inspection for electronically scanning the body under inspection with beams and receives ultrasonic waves reflected from the body under inspection. Although the illustration is omitted, the transmitter/receiver 1 internally comprises multi-channels of vibrator elements, each of which serves as an ultrasonic wave generating source as well as a receiver for receiving reflected echoes. Wave transmission drivers 2 supply the transmitter/receiver 1 with pulses, required to drive the respective vibrator elements in the transmitter/receiver 1 to emit ultrasonic waves at predetermined timings. The number of the used wave transmission drivers 2 is, for example, equal to the number of the channels of the vibrator elements. A transmission control circuit 3 controls the timing at which a wave transmission pulse is generated from the wave transmission driver 2 to the transmitter/receiver 1. Specifically, the transmission control circuit 3 provides phase differences among the respective channels so as to focus ultrasonic waves transmitted from the transmitter/receiver 1. Thus, the transmitter/receiver 1, the wave transmission driver 2, and the transmission control circuit 3 constitute a transmission means for transmitting ultrasonic pulses or ultrasonic continuous waves to a body under inspection.

A limiter 4 serves as an entrance for fetching received wave signals from the transmitter/receiver 1. Specifically, the limiter 4 is formed of a diode for limiting high voltage signals from the wave transmission side. Pre-amplifiers 5 each amplify a signal received by the transmitter/receiver 1 which is inputted thereto through the limiter 4. The pre-amplifiers 5 are variable gain amplifiers, the gain of which is varied by a control signal supplied thereto from the outside, i.e. from respective digital analog convertors 17. The number of the used pre-amplifiers 5 is, for example, equal to the number of the channels of the vibrator elements in the transmitter/receiver 1. Thus, the transmitter/receiver limiter 4 and the amplifiers 5 constitute a reception means for receiving reflected waves from a region to be diagnosed in the body under inspection and amplifying the received wave signals.

Focusing circuits 6 are supplied with the received wave signals after amplified by the corresponding amplifiers 5 in the reception means, and converge these signals representing beams reflected from the body under inspection. Each of the focusing circuits 6 is formed of, for example, an analog delay line such as an LC (lumped constant) delay line or a digital delay means which may be a combination of an analog delay line and an A/D convertor. The number of the used focusing circuits is equal to the number of the channels of the vibrator elements in the transmitter/receiver 1. The focusing circuits 6 provide the respective channels with different delay time amounts so as to converge the received wave signals. A deflection circuit 7, which deflects the received wave signals outputted from the focusing circuit 6, is formed of, for example, an LC delay line or the like. The deflection circuit 7 provides the respective channels with different delay time amounts so as to appropriately deflect the received wave signals. It should be noted that when the focusing circuits 6 are each formed of a combination of an A/D convertor and a memory element, the focusing circuits 6 and the deflection circuit 7 are generally formed of a circuit which performs these functions.

A post-processing circuit 8 compresses the received wave signal processed by the focusing circuits 6 and outputted through the deflection circuit and detects the envelope of the received wave signal, and is composed of, for example, an LOG compress circuit and a detector circuit or the like.

An A/D convertor (ADC) 9 converts an output signal from the post-processing circuit 8 to a digital signal. A buffer memory 10, which temporarily stores an image signal outputted from the ADC 9, stores the image signal in an ultrasonic scan line unit. An image memory 11 reads image signals temporarily stored in the buffer memory 10 and stores them thereinto for image display. The image memory 11 is designed to time-sequentially fetch the image signal in the ultrasonic scan line unit. The ADC 9, the buffer memory 10, and the image memory 11 constitute an image processing means which receives an output signal from the post-processing circuit 8, A/D converts the received wave signal, and performs processing for image display on the digitally converted signal.

An image display circuit 12 receives a signal read from the image memory 11 and processes it to comply with a format of a display unit 13 connected thereto at the next stage. The display unit 13 receives an image signal outputted from the image display circuit 12 and displays an ultrasonic image represented by the image signal. The display unit 13 is formed of, for example, a television monitor. The image display circuit 12 and the display unit 13 constitute a display means which receives an image signal from the image processing means and displays an image represented by the image signal. For the respective components of the display means, those employed in an ultrasonic diagnostic apparatus (model EUB-165A, EUB-555, or the like) provided by Hitachi Medical Corporation may be used. For further details of the principle of the ultrasonic diagnosis, see U.S. Pat. No. 4,127,034. This patent is incorporated herein by reference.

Figure 1:
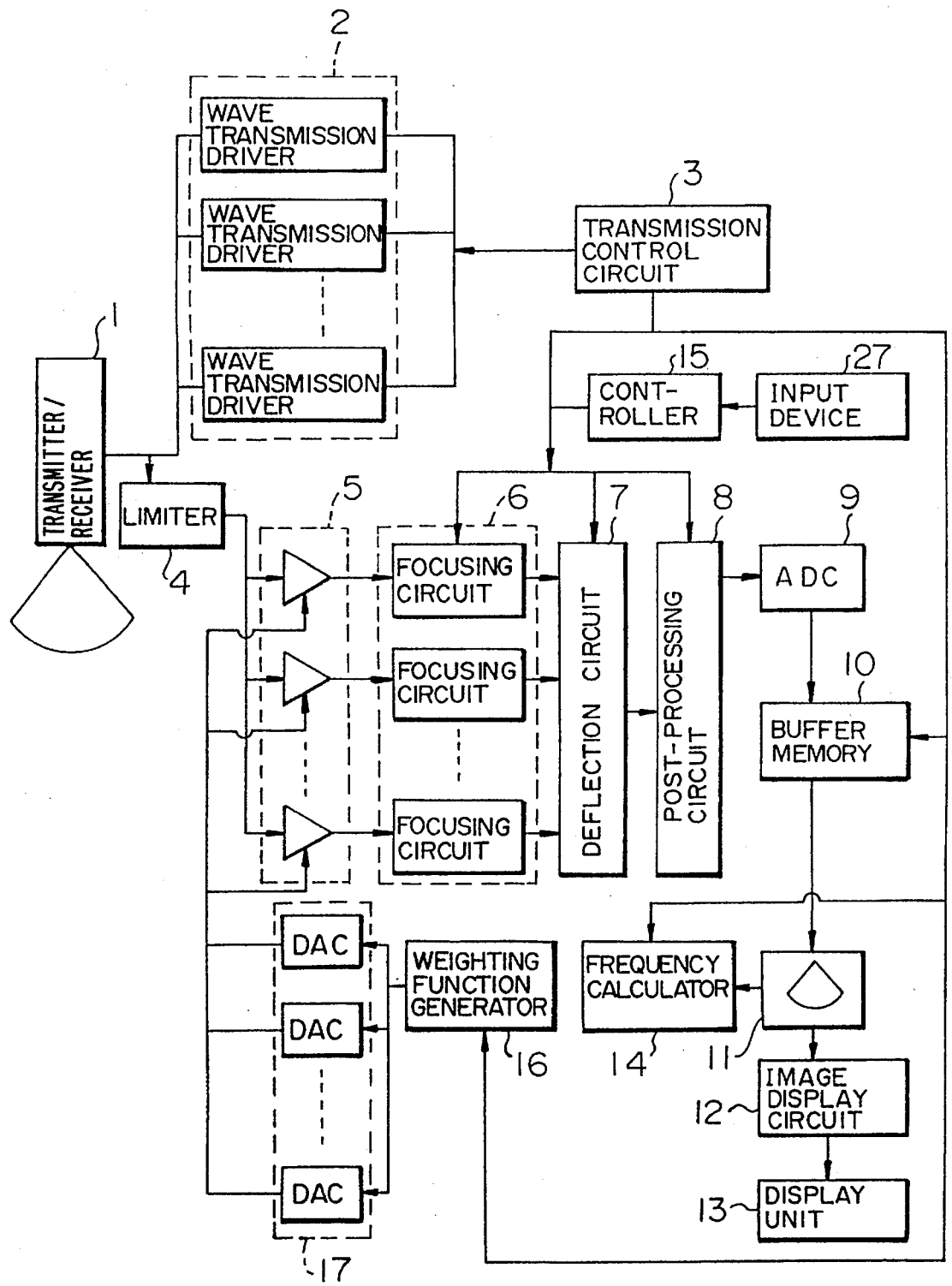
FIG. 1 is a block diagram showing the configuration of a conventional exemplary ultrasonic diagnostic apparatus.
Figure 2:
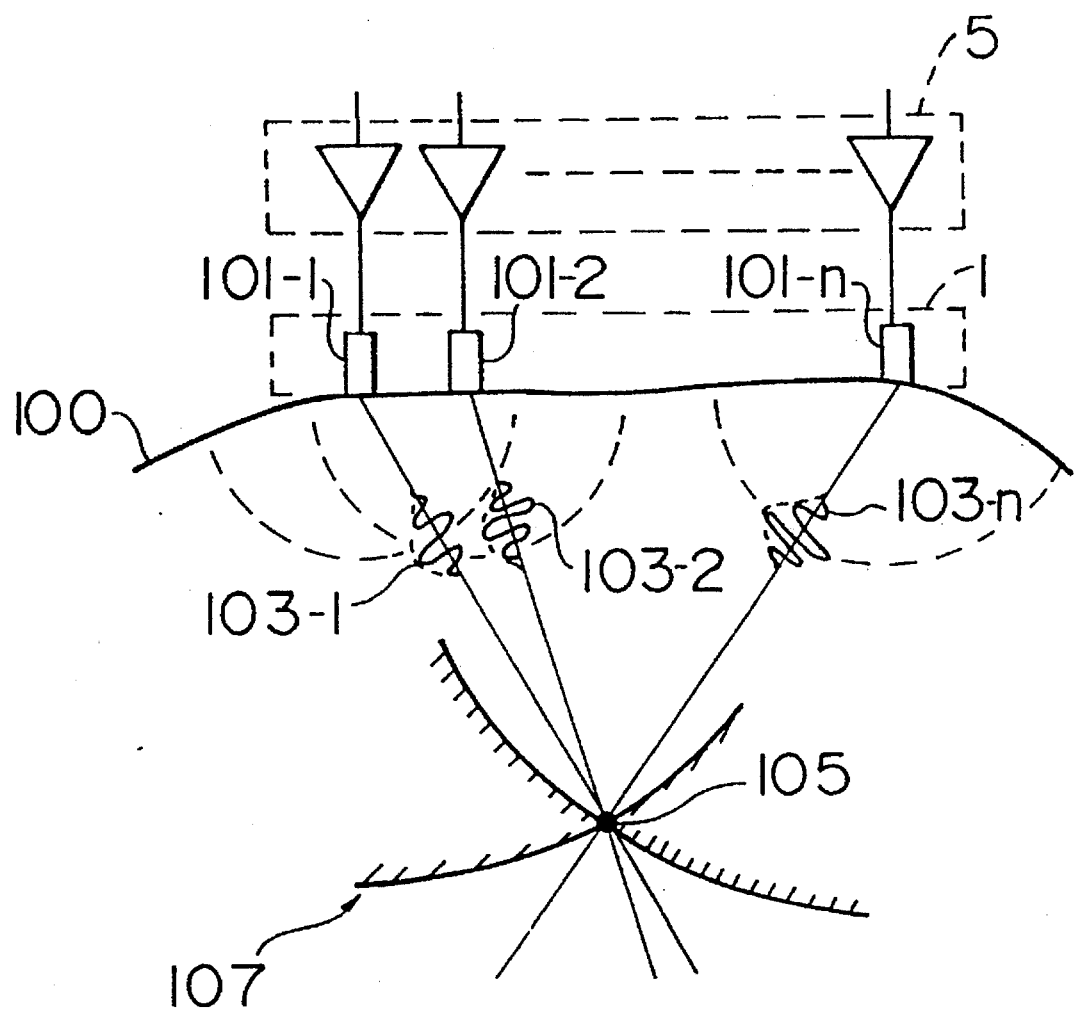
FIG. 2 is a diagram showing behaviors of ultrasonic waves emitted to an organism.
Figure 3A:
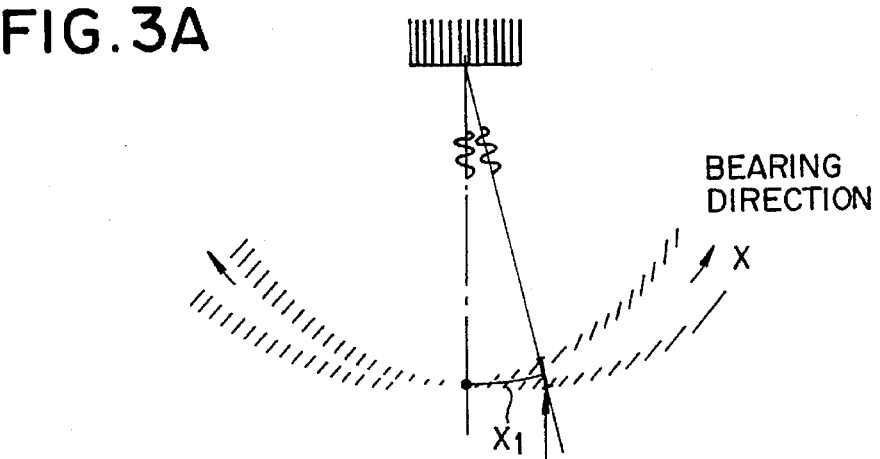
FIGS. 3A and 3B are diagrams used for explaining the resolution in a bearing direction.
Figure 3B:
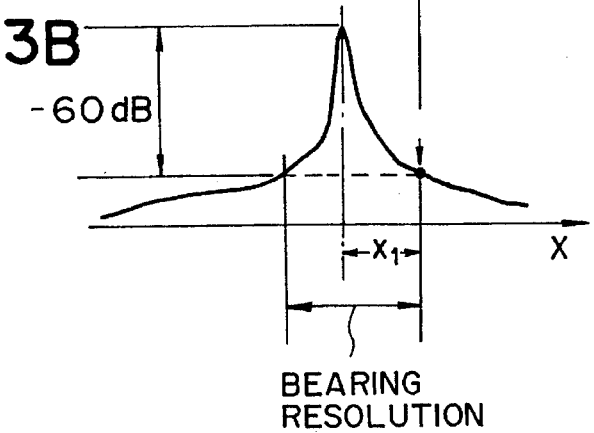
Figure 4A:
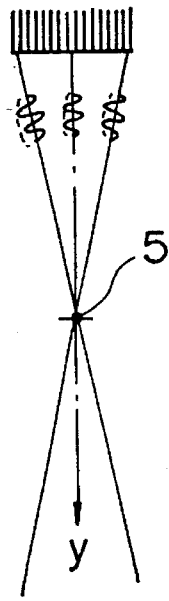
FIGS. 4A and 4B are diagrams used for explaining the resolution in a distance direction.
Figure 4B:
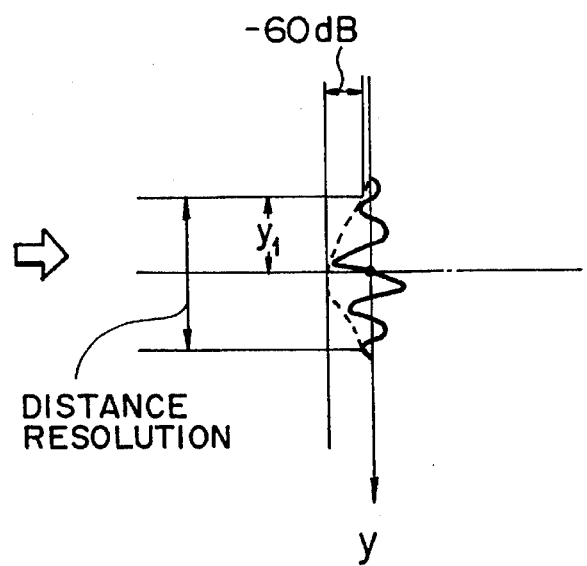

Referring further to FIG. 1, reference numeral 14 designates a frequency calculator which receives an image signal representing an ultrasonic tomographic image from the image memory 11 constituting part of the image processing means, and displays in graphic representation or the like the relationship between the luminance of the image signal and its frequency in a region specified by the operator on a still image displayed on the display unit 13; and 15 a controller for controlling the operations of the respective components.

Figure 6:
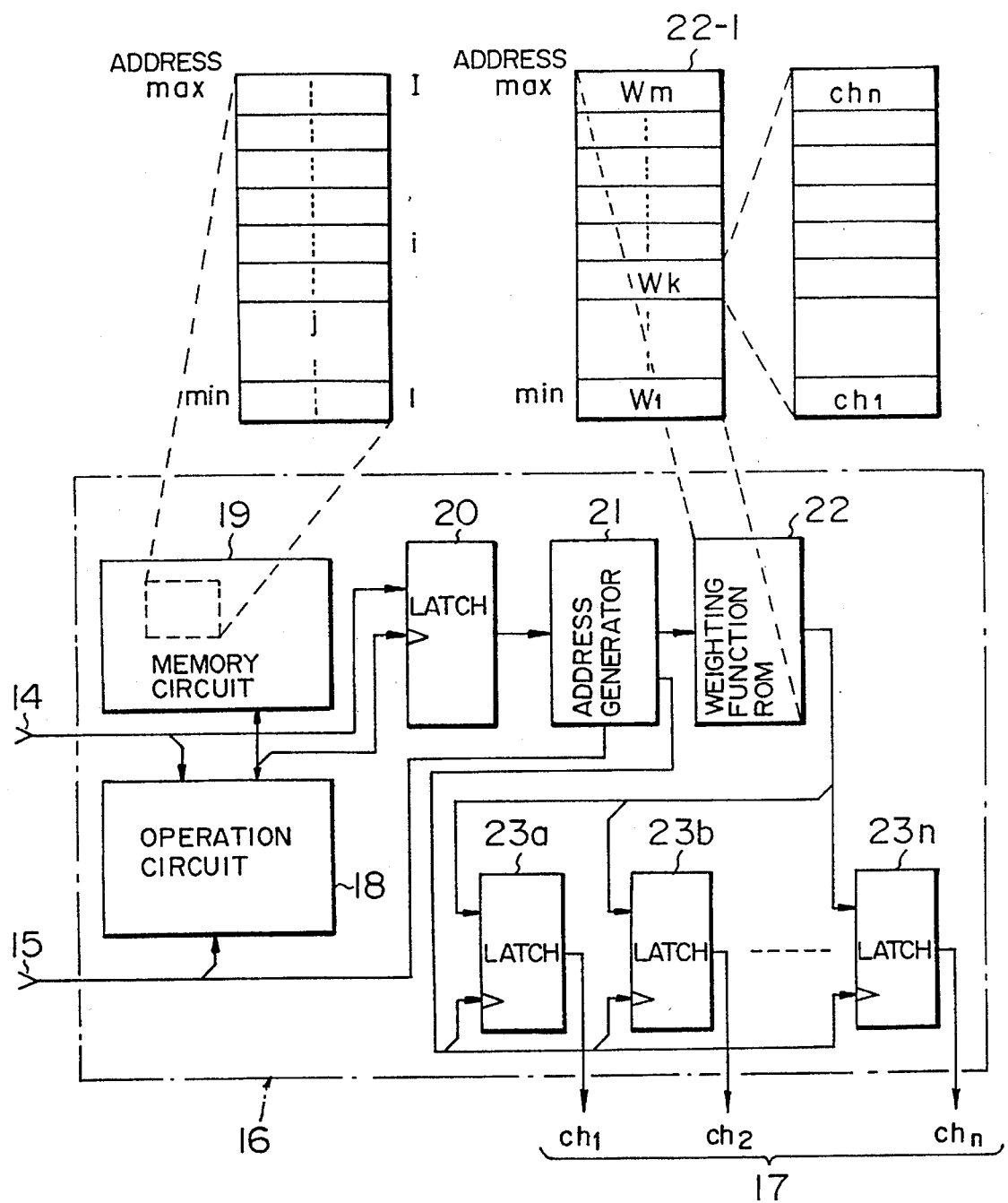
FIG. 6 is a block diagram showing the configuration of a weighting function generator.

It should be pointed out here that in this embodiment, a weighting function generator 16 is connected to the output of the frequency calculator 14. This weighting function generator 16 receives a signal indicating the relationship between the luminance of an image signal representative of an ultrasonic tomographic image and its frequency, calculated by the frequency calculator 14, refers to the luminance of the image signal, and changes a weighting function applied to a received wave signal in accordance with the result of the reference. The internal configuration of the weighting function generator 16 is composed of an operation circuit 18, a memory circuit 19, a latch 20, an address generator 21, a weighting function ROM 22, and a plurality of other latches 23a, 23b, . . . 23n, as shown in FIG. 6. A weighting function outputted from the weighting function generator 16 is converted to an analog signal by a D/A convertor (DAC) 17, and then delivered to the pre-amplifiers 5 of the respective channels for amplifying received wave signals.

Next, the operation of the ultrasonic diagnostic apparatus thus configured will be explained again with reference to FIG. 5. First, the transmitter/receiver 1 is brought inco contact with the surface of a body under inspection and started to transmit ultrasonic waves to a region to be diagnosed. In this event, scanning ultrasonic waves are controlled by the transmission control circuit 3 such that they form fine beams in the region to be diagnosed. Then, the transmitter/receiver 1 is supplied with pulses required to drive the respective vibrator elements by the transmission driver 2. The transmitted beams reflected from the region to be diagnosed in the body under inspection are received by the transmitter/receiver 1. The received wave signals are passed through the limiter 4 so as to limit high voltage components from the wave transmission side. The received wave signals, passing through the limiter 4, are amplified by the pre-amplifiers 5. In this event, the weighting function generator 16 outputs a predetermined weighting function Win as a default weighting function. Then, the transmitter/receiver 1 sequentially changes, every predetermined cycle, the direction in which waves are transmitted therefrom and the direction in which reflected waves are received thereby, and repeatedly transmits and receives ultrasonic wave pulses or transmits continuous ultrasonic waves so as to scan the region to be diagnosed with the ultrasonic waves.

The received wave signals amplified by the respective pre-amplifiers 5 are sequentially inputted to the focusing circuits 6 and next to the deflection circuit 7. The received wave signal, after subjected to predetermined beam convergence in the focusing circuits 6 and predetermined deflection in the deflection circuit 7, is next processed by the post-processing circuit 8 which performs LOG compress and detects the envelope of the received wave signal. The received wave signal is then converted to a digital signal by the ADC 9 and stored in the buffer memory 10 in an ultrasonic scan line unit. The data in the ultrasonic scan line unit is delivered to the image memory 11, written thereinto, and read therefrom so as to form an ultrasonic wave tomographic image, wherein the wave transmitting and receiving directions are corresponded for each ultrasonic beam. The read data representing the ultrasonic tomographic image is converted to an analog image signal by an internal D/A convertor of the image display circuit 12, which has been adjusted to perform the conversion at the timing required by the display unit 13. The analog image signal is finally displayed on the display unit 13. The controller 15 performs the transmission control such as the focusing of transmitted waves, reception control such as the focusing of received waves, and read/write control of the respective memories in conformity to the ultrasonic wave transmitting and receiving timings, respectively.

Figure 7A:
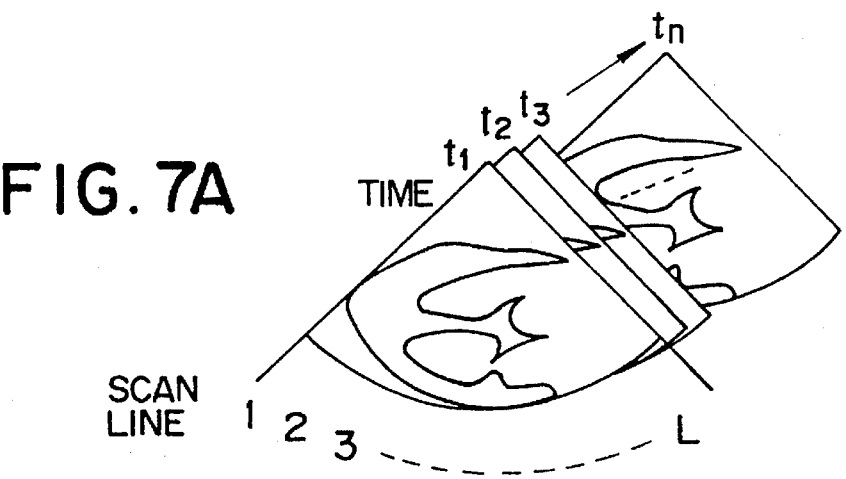
FIG. 7A shows images at different time points.
Figure 7B:
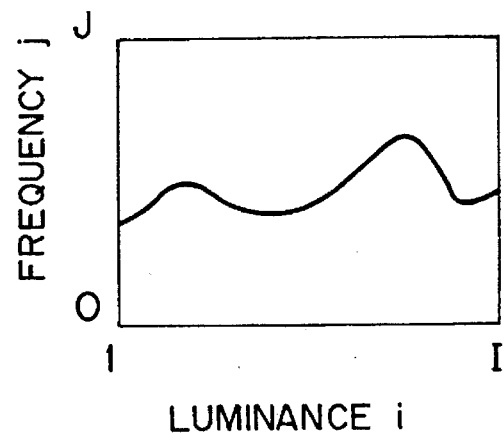
FIG. 7B is a graph showing the relationship between the luminance and its frequency in an image at a time point.
Figure 7C:
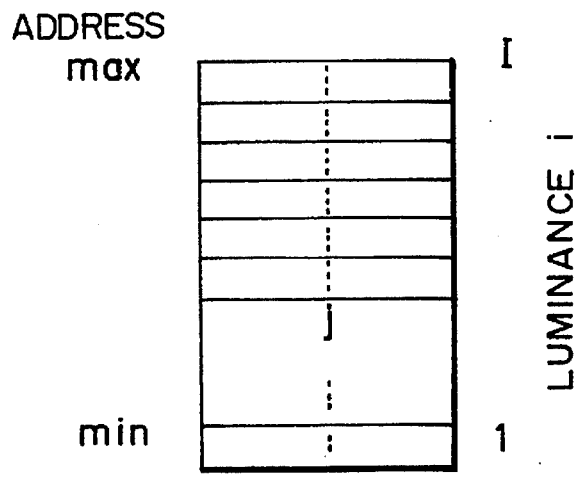
FIG. 7C is a table indicating the relationship represented by FIG. 7B.

In a state as described above, the controller 15 controls the image memory 11 so as to send data for an ultrasonic tomographic image or for each ultrasonic scan line to the frequency calculator 14. The frequency calculator 14 calculates the frequency of the luminance of the image and sends the result to the weighting function generator 16. This frequency calculation will be specifically explained with reference to FIGS. 7A, 7B. Assume first that images are sequentially stored in the image memory 11, as shown in FIG. 7A. Assuming also that a current time is designated t1 and a body under inspection is to be scanned with scan lines 1–L, data on the first ultrasonic tomographic image or data on the ultrasonic scan line 1 at the time t1 is sent to the frequency calculator 14. Hereinafter, explanation will be omitted for the case where data is sent in the ultrasonic scan line unit. However, it goes without saying that the effects of the present embodiment are also produced by the data processing in the ultrasonic scan line unit, and in addition, the data processing based on scan line is more suitable to real time processing than the data processing in the unit of one image. The ultrasonic tomographic image sent to the frequency calculator 14 is subjected to frequency calculation processing. The data produced by this processing presents the relationship between the luminance i and the frequency j, when represented by a graph, as shown in FIG. 7B. The frequency values j are stored corresponding to respective luminance values in a storage means such as RAM in the frequency calculator 14. This data is sent to the weighting function generator 16.

Figure 8A:
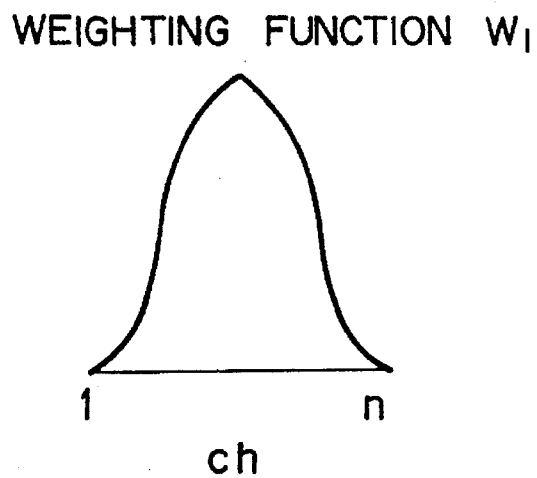
FIGS. 8A–8C show a variety of weighting functions.
Figure 8B:
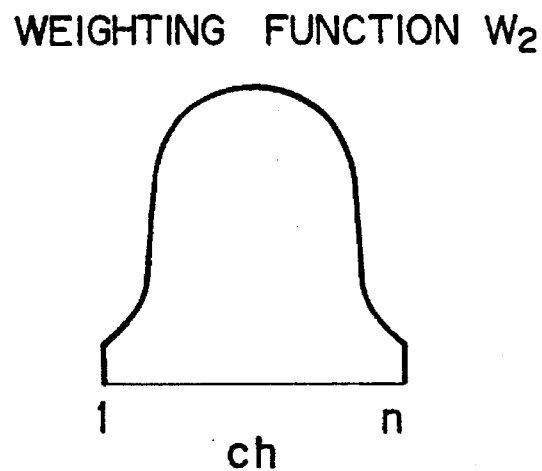
Figure 8C:
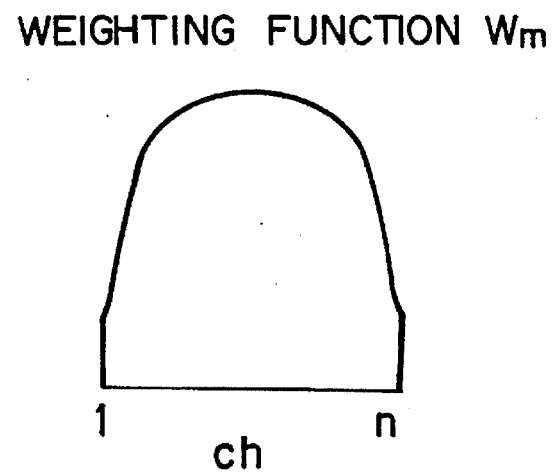

Next, the operation of the weighting function generator 16 will be specifically explained with reference to FIG. 6. In the weighting function generator 16, the operation circuit 18 first reads data on the frequency j corresponding to the luminance i of an image from a memory circuit formed of memory elements such as RAM. Then, a weighted average value kij of the luminance i of the image and the associated frequency j is calculated. The operation circuit 18 outputs this weighting average value kij to the latch 20. In weighting functions $W_1$–$W_m$ are stored as shown in FIGS. respective addresses 22-1 of the ROM 22, a variety of weighting functions $W_1$–$W_m$ are stored as shown in FIGS. 8A–8C. The address generator 21 generates an address so as to select one from the weighting functions $W_1$–$W_m$ in the ROM 22 corresponding to a weighted average value inputted thereto. A weighting function Wk read from the ROM 22 is sequentially written into a plurality of latches 23a–23n corresponding to the respective channels. Then, data outputted from these latches 23a–23n are inputted to the DAC 17 and converted into analog control signals which are then supplied to the corresponding pre-amplifiers 5 in order to change the gains thereof. In this way, the initially set weighting function Win is changed to the weighting function Wk corresponding to the image signal. The above is the operation performed when the body under inspection is scanned by scan lines 1–L at the time $t_1$ in FIG. 7A. Similar operation is repeated at time $t_2$, $t_3$, ...

Figure 9A:
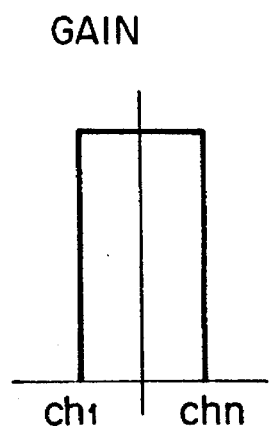
FIGS. 9A–9D show relationships between weighting functions and directional functions.
Figure 9B:
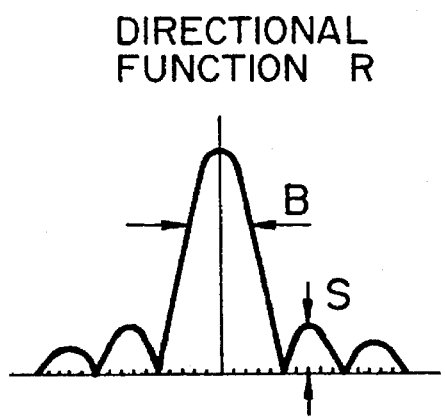
Figure 9C:
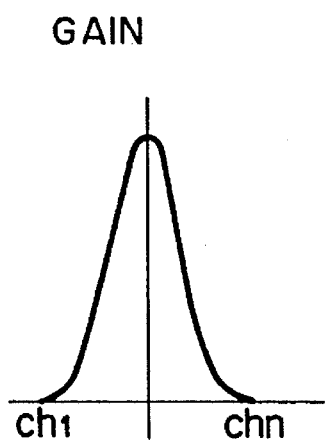
Figure 9D:
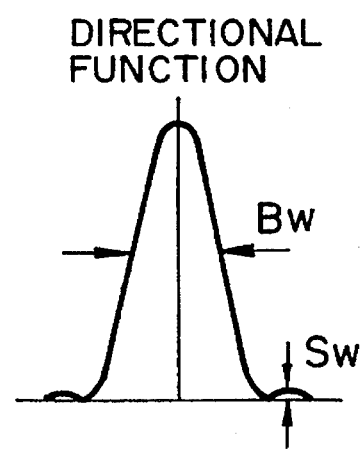
Figure 10A:
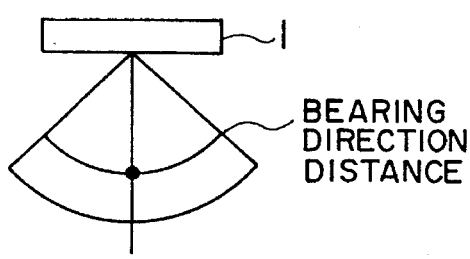
FIGS. 10A and 10B show how a directional function is changed by respective weighting functions.
Figure 10B:
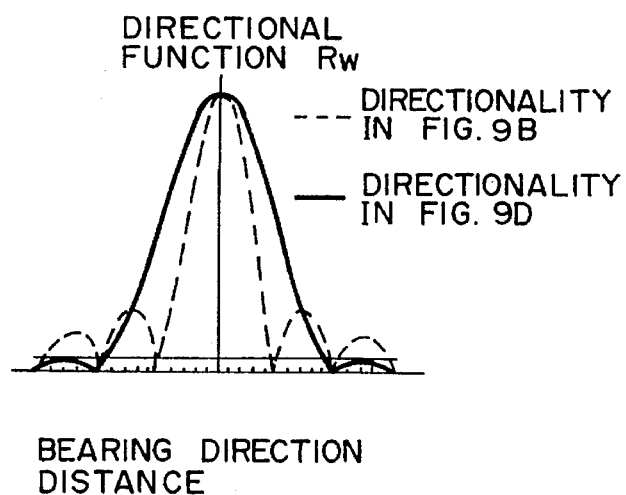
Figure 11A:
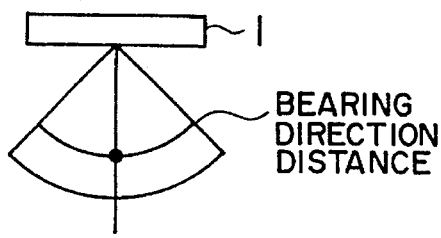
FIGS. 11A and 11B show how the directional function is changed by other weighting functions.
Figure 11B:
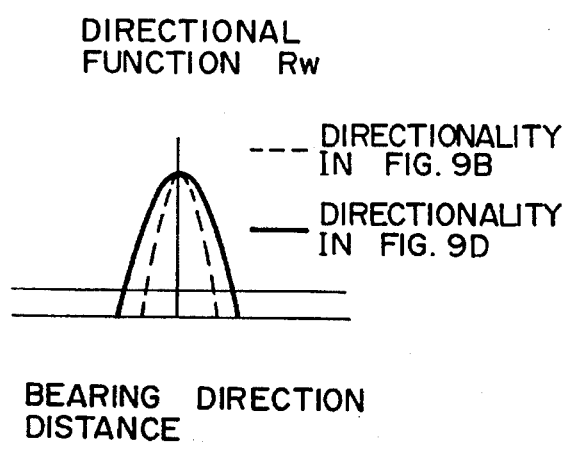

When the weighting function is changed from a rectangular shape as shown in FIG. 9A to, for example, a Gaussian shape as shown in FIG. 9C by the operations described above, a directional function Rw shown in FIG. 9D has an increased main beam width Bw and decreased side lobes, as can be seen from a comparison of FIG. 9B with FIG. 9D. On the other hand, acoustic impedance in an organism largely differs depending on different organizations. It is said, for example, that lever and so on have a damping factor of 1 dB/MHz/cm, and much damping also occurs in an organism. For this reason, with a signal representing a highly reflected wave as shown in FIG. 10B, if side lobes are each larger than a lower limit of the signal determined by system noise, an effect of reduction in side lobes provided by the weighting appears on a displayed image. However, with a signal representing a low reflected wave as shown in FIG. 11B, since side lobes are smaller than the lower limit of the signal determined by system noise, no effect of reduction in side lobes appears on a displayed image. On the contrary, the bearing resolution is deteriorated correspondingly by an increase in the main lobe width. A weighting function preferable for such a case is not a Gaussian type shown in FIG. 9C but a rectangular type shown in FIG. 9A. In this way, the present embodiment allows the shape of the weighting function to be changed in accordance with the magnitude of a signal representing a reflected wave, which has not been able to be achieved by the prior art. Specifically, the weighting can be applied to a strong signal such that a side lobe reduction effect is produced on a displayed image as well as to a weak signal such that deterioration of the bearing resolution is minimized.

While the foregoing embodiment shown in FIG. 5 has been explained with the weighting function being rectangular and Gaussian types, it will be understood that other types of weighting functions may of course be used. Also, while the pre-amplifiers have been explained as being variable gain amplifiers, they may be fixed gain amplifiers, and variable gain amplifiers may be used within the focusing circuits or at the outputs thereof.

Second Embodiment

Figure 12:
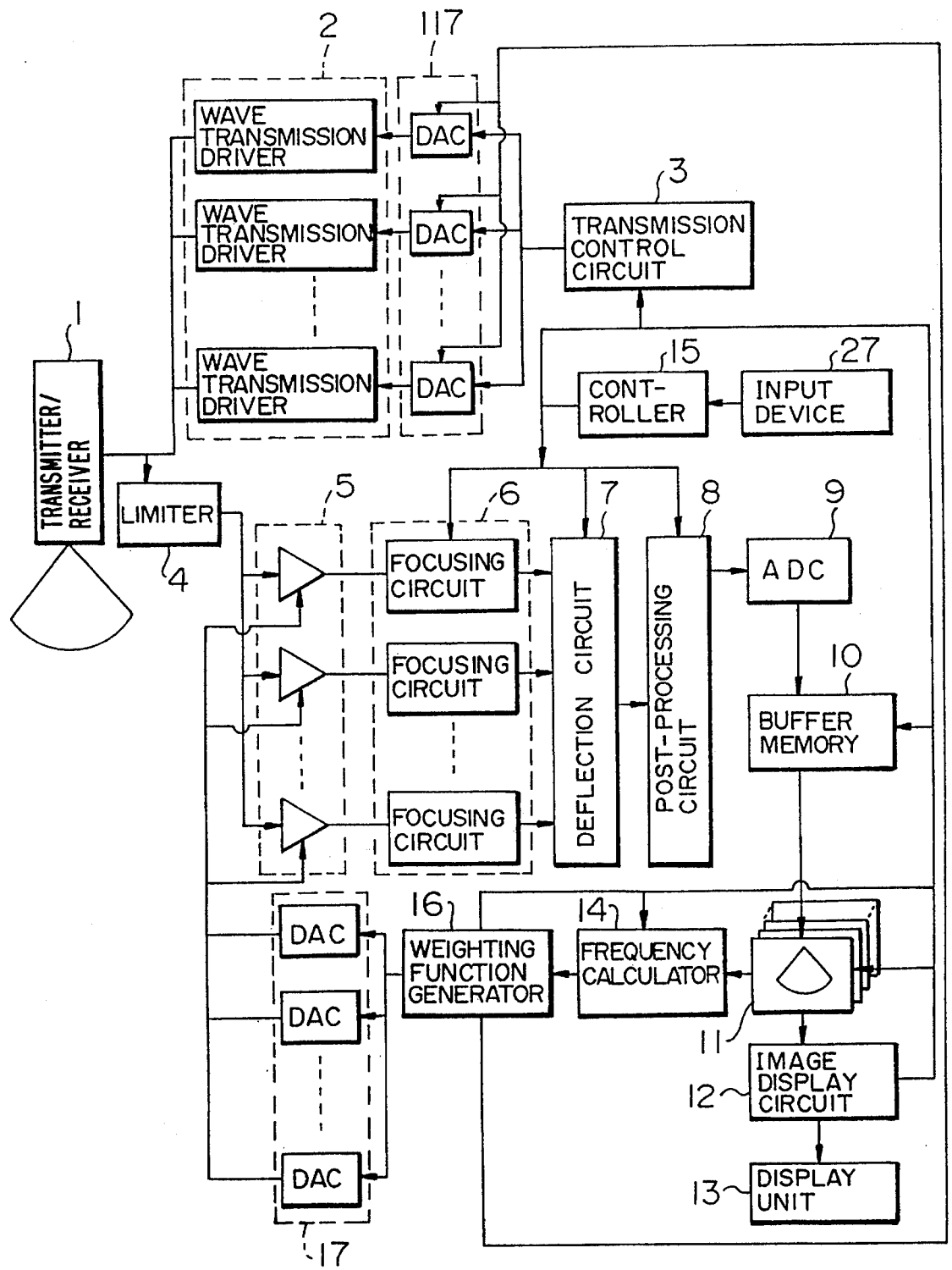
FIG. 12 is a block diagram showing the configuration of an ultrasonic diagnostic apparatus according to a second embodiment of the present invention.

FIG. 12 shows the configuration of an ultrasonic diagnostic apparatus according to a second embodiment of the present invention. Components in FIG. 12 identical to those in FIG. 5 are designated the same reference numerals, and explanation thereof will be omitted.

In this embodiment, transmitted waves are as well weighted by an output of the weighting function generator 16, and the weighting function is dynamically changed in accordance with the luminance of an image. Reference numeral 117 in FIG. 12 designates D/A convertors which control the outputs of the corresponding wave transmission drivers 2 in accordance with an output signal of the weighting function generator 16. Assume that a weighting function applied to transmitted waves is identical to that applied to received waves. Of course, different weighting functions may be applied respectively to the transmitted and received waves.

It is also possible to dynamically change a weighting function applied to transmitted waves only, and fix a weighting function applied to received waves in accordance with a transmitter, as the aforementioned prior art example.

Third Embodiment

Figure 13:
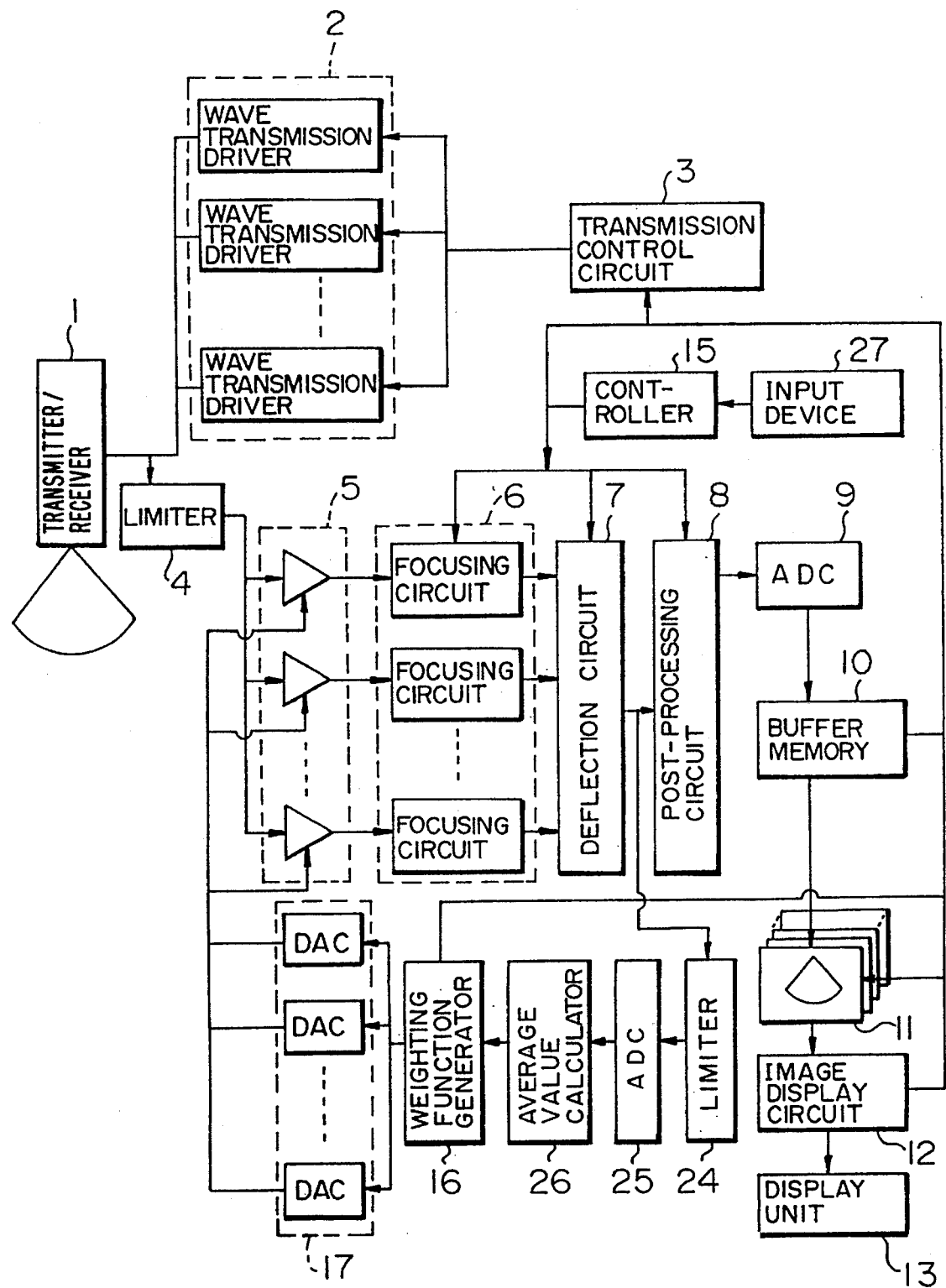
FIG. 13 is a block diagram showing the configuration of an ultrasonic diagnostic apparatus according to a third embodiment of the present invention.

FIG. 13 shows a third embodiment of the present invention. Components in FIG. 13 identical to those explained in connection with the first embodiment are designated the same reference numerals, and explanation thereof will be omitted. While the first embodiment shown in FIG. 5 fetches an image signal from the image memory 11 and uses it to change a weighting function, this embodiment provides a means which fetches a received wave signal after processed by the focusing circuits 6 and outputted through the deflection circuit 7, refers to the magnitude of the received wave signal, and changes a weighting function in accordance with the result of the reference. This weighting function changing means is composed of a limiter 24 for fetching a received wave signal outputted from the deflection circuit 7; an A/D convertor (ADC) 25; an average value calculator 26; and a weighting function generator 16 in FIG. 13. A weighting function outputted from the weighting function generator 16 is converted into an analog signal by respective D/A convertors 17 and then delivered to pre-amplifiers 5 of respective channels for amplifying received wave signals.

Figure 14A:
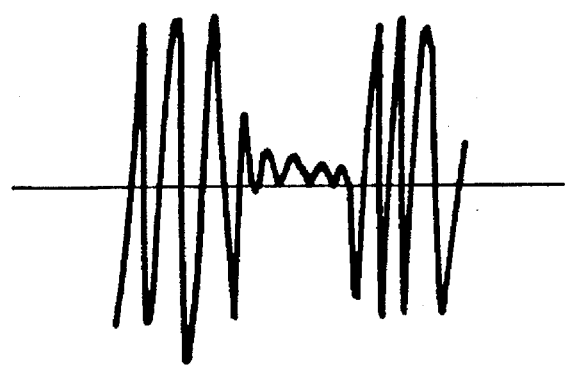
FIG. 14A shows an output waveform of a deflection circuit in FIG. 13.
Figure 14B:
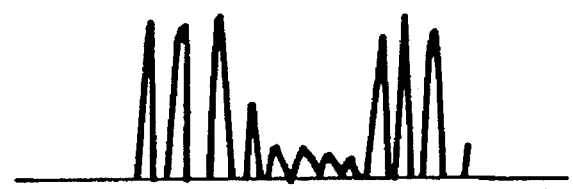
FIG. 14B shows an output waveform of a limiter in FIG. 13.

The operation of the third embodiment configured as described above will next be explained. First, an output signal (see FIG. 14A) of the deflection circuit 7 is sent to the limiter 24. The limiter 24, formed of, for example, a diode or the like, cuts negative components (see FIG. 14B) included in the supplied signal. The signal having its negative components removed is next converted into a digital signal by the ADC 25. Next, in the average value calculator 26, data sequentially sent thereto is averaged. The average value Ka calculated by and outputted from the average value calculator 16 is expressed by:

$$Ka = \frac{\sum_{i=1}^{N} Ai \times Bi}{N}$$

where Bi represents the output of the average value calculator 26, and N the number of data to be averaged.

Figure 14C:
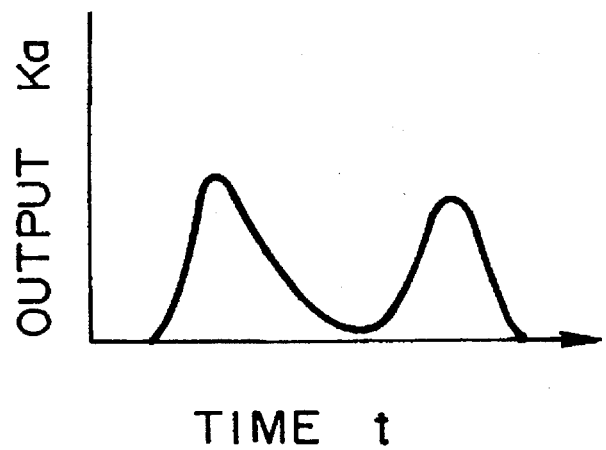
FIG. 14C shows an output waveform of an average calculator in FIG. 13.

By repeating the above operation, the average value Ka is sequentially calculated with the lapse of time. Graphically representing the relationship between time t and the output Ka of the average value calculator 26, a graph as shown in FIG. 14C results. Then, the output Ka of the average value calculator 26 is inputted to the weighting function generator 16 and processed thereby in a manner similar to the first embodiment. The output of the weighting function generator 16 is passed through the DAC's 17 to the pre-amplifiers 5 to control the gains of the respective pre-amplifiers 5. According to the third embodiment, use of the output signal of the deflection circuit 7 enables changes in the magnitude of a received wave signal to be directly reflected to the weighting function. It is also appreciated that the third embodiment is more suitable to real time processing than the first embodiment, and that control can be performed, for example, in a unit of pixels constituting each ultrasonic scan.

Referring next to FIG. 15, explanation will be given of another embodiment of the present invention, wherein a weighting function W is changed to such a shape that can largely enhance the effect of reducing deterioration of the bearing resolution even with a weak signal. Assuming now that a weighting function has a Gaussian curve as shown in FIG. 15A, this weighting function is expressed by:

$$W = e^{-ax^2}$$

where a represents a coefficient. As described earlier, if the weighting function shown in FIG. 9C is applied, the resulting waveform shown in FIG. 9D presents an increased main beam width Bw. Therefore, to avoid this increase in the main beam width, a rectangular component may be incorporated in the Gaussian type weighting function of FIG. 15A to produce a weighting function as shown in FIG. 15B. The weighting function of FIG. 15B is expressed by:

$$W = Kb \times e^{-ax^2} + Kc$$

where coefficients Kb, Kc are each a real number ranging from "1" to "0". Changing this coefficient Kb, the shape of the weighting function W changes as shown in FIGS. 15A–15D. It can be seen from these figures that the rectangular component may be arbitrarily set by changing the coefficient Kb in the foregoing way. With this arbitrary setting capability, a weighting function w1 having a large difference between a peak value and a minimum value as shown in FIG. 15A may be applied to a high luminance signal, while a weighting function Wm having a small difference between a peak value and a minimum value as shown in FIG. 15D may be applied to a low luminance signal. Such shapes of the weighting function may have been previously calculated in the above-mentioned manner and written in the weighting function ROM 22 shown in FIG. 6, or a calculator means may be additionally provided for calculating and outputting a suitable shape of the weighting function for a given luminance signal.

Further, for maximally utilizing the dynamic range of a system, the coefficients Kb, Kc may be selected to satisfy Kc=1-Kb such that various weighting functions have the same peak value as shown in FIGS. 16A–16D. If it is difficult to select the coefficients Kb, Kc to strictly satisfy Kc=1-Kb due to errors in gain, frequency characteristics, and so on of a device on the ultrasonic diagnostic apparatus, the coefficients Kb, Kc need not strictly satisfy Kc=1-Kb. In this case, the dynamic range of the system can be effectively utilized by approaching the coefficients Kb, Kc as closely as possible to this concept. Generally, when variable gain amplifiers are employed for the pre-amplifiers 5, time gain control (TGC) is performed. In this event, with a TGC gain being designated Gtgc, the gain of each pre-amplifiers 5 may be expressed by a product of the weighting function W and the TGC gain Gtgc. Also with a so-called variable aperture transmitter/receiver 1 which adjusts the aperture in accordance with a depth, the weighting function W may be regarded in a similar sense.

While in the foregoing explanation, a Gaussian curve has been used as a shape of the weighting function W, other shapes may also be used. If an alternative shape is used, it need not be symmetric about the central axis, or the central channel need not present a peak value. Putting the so far given explanation in a different way for the case where the weighting function W is regarded as a set of discrete values, as is the case where the weighting function W was obtained by experiment, a weighing function having a large difference between a peak value and a minimum value is applied to strongly reflected waves or image signals, while a weighting function having a small difference between a peak value and a minimum value is applied to weak signals, thus maximizing the transmitted wave power or received wave gain within an available range of gain control (TGC) for correcting attenuation in an organism.

Further, as shown in FIGS. 5, 12, and 13, by setting a region of interest on an ultrasonic wave tomographic image displayed on the display unit 13 through an input device 27 such as a track ball or a mouse connected to the controller 15, the weighting function generator 16 may limitatively refer to the region of interest set by the input device 27 as a range in which the weighting function generator 16 refers to the luminance of an image signal from the image memory 11 (in the embodiments shown in FIGS. 5 and 12) or the magnitude of a received wave signal from the focusing circuits 6 (in the embodiment shown in FIG. 13).

According to the foregoing embodiment, the weighting function changing means, which is arranged to receive an image signal from the image processing means or receive a received wave signal from the focusing circuit, refers to the luminance of an image signal from the image processing means or the magnitude of a received wave signal from the focussing circuit, changes a weighting function in accordance with the result of the reference, and can weight transmitted waves for changing the amplitude or the like of the transmitted waves for each channel or for every plural number of channels or weight received waves for changing the amplitude of the received waves. This results in preventing deterioration of the bearing resolution even with weak signals and providing images with good contrast.

Fourth Embodiment

Figure 17:
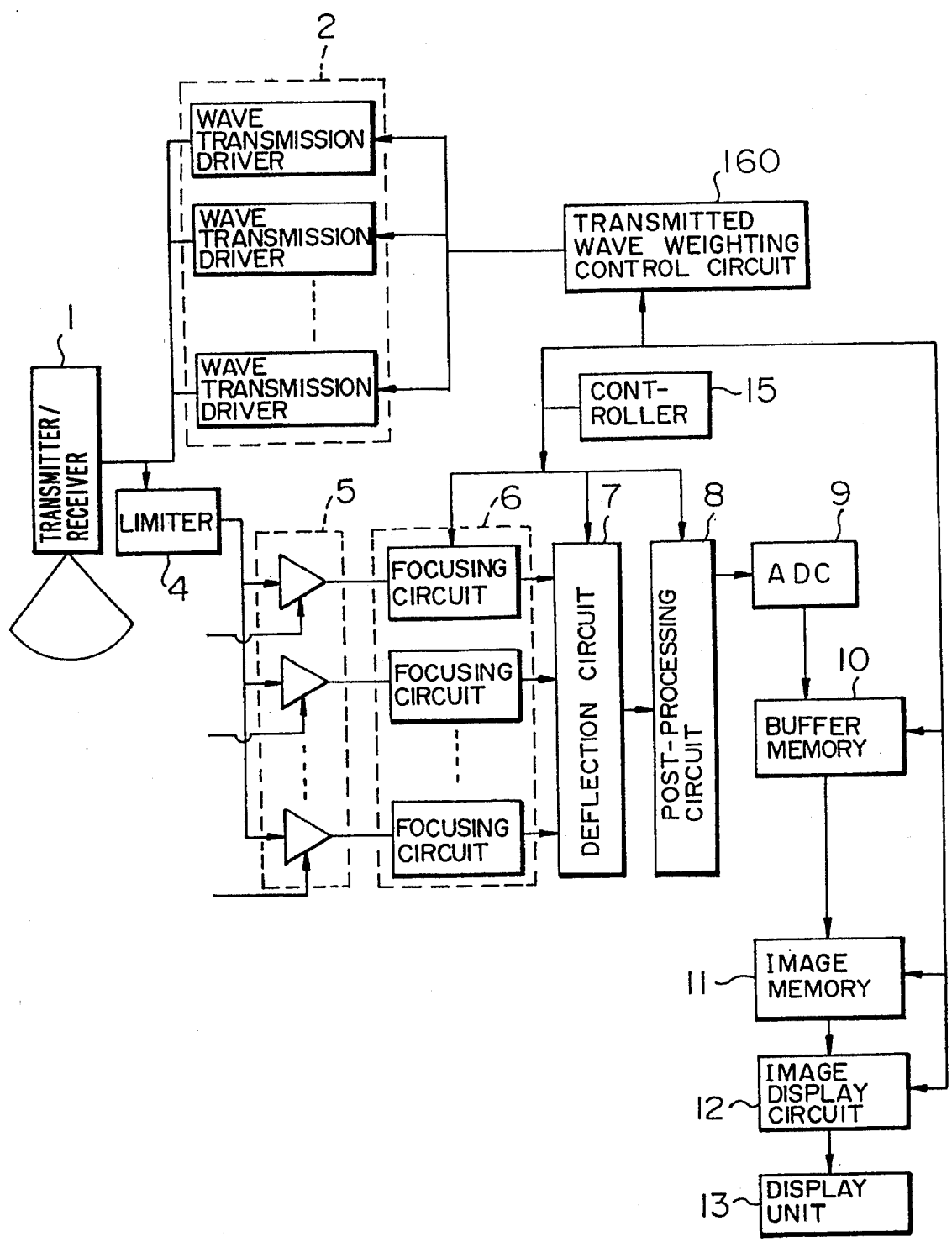
FIG. 17 is a block diagram showing the configuration of an ultrasonic diagnostic apparatus according to a fourth embodiment of the present invention.

An ultrasonic diagnostic apparatus of this embodiment features that a transmitted wave weighting control circuit 160 is provided as shown in FIG. 17. It should be noted that while no weighting function generator is provided on the wave receiving side, one shown in the prior art example or one shown in the first embodiment may be used together with the frequency calculator 14. Components in FIG. 17 identical to those in the first embodiment are designated the same reference numerals, and explanation thereof will be omitted.

The transmitted wave weighting control circuit 160 controls the generation timing of transmitted wave pulses sent from the wave transmission drivers 2 to the transmitter/receiver 1. More specifically, this control circuit 160 provides phase differences among respective channels so as to focus ultrasonic waves transmitted from the transmitter/receiver 1, and controls the gain and delay time amount for the respective wave transmission drivers 2 in accordance with a predetermined weighting function and focusing operation. The transmitter/receiver 1, the wave transmission drivers 2, and the transmitted wave weighting control circuit 160 constitute a transmission means for transmitting ultrasonic wave pulses or ultrasonic continuous waves to a body under inspection.

Figure 18:
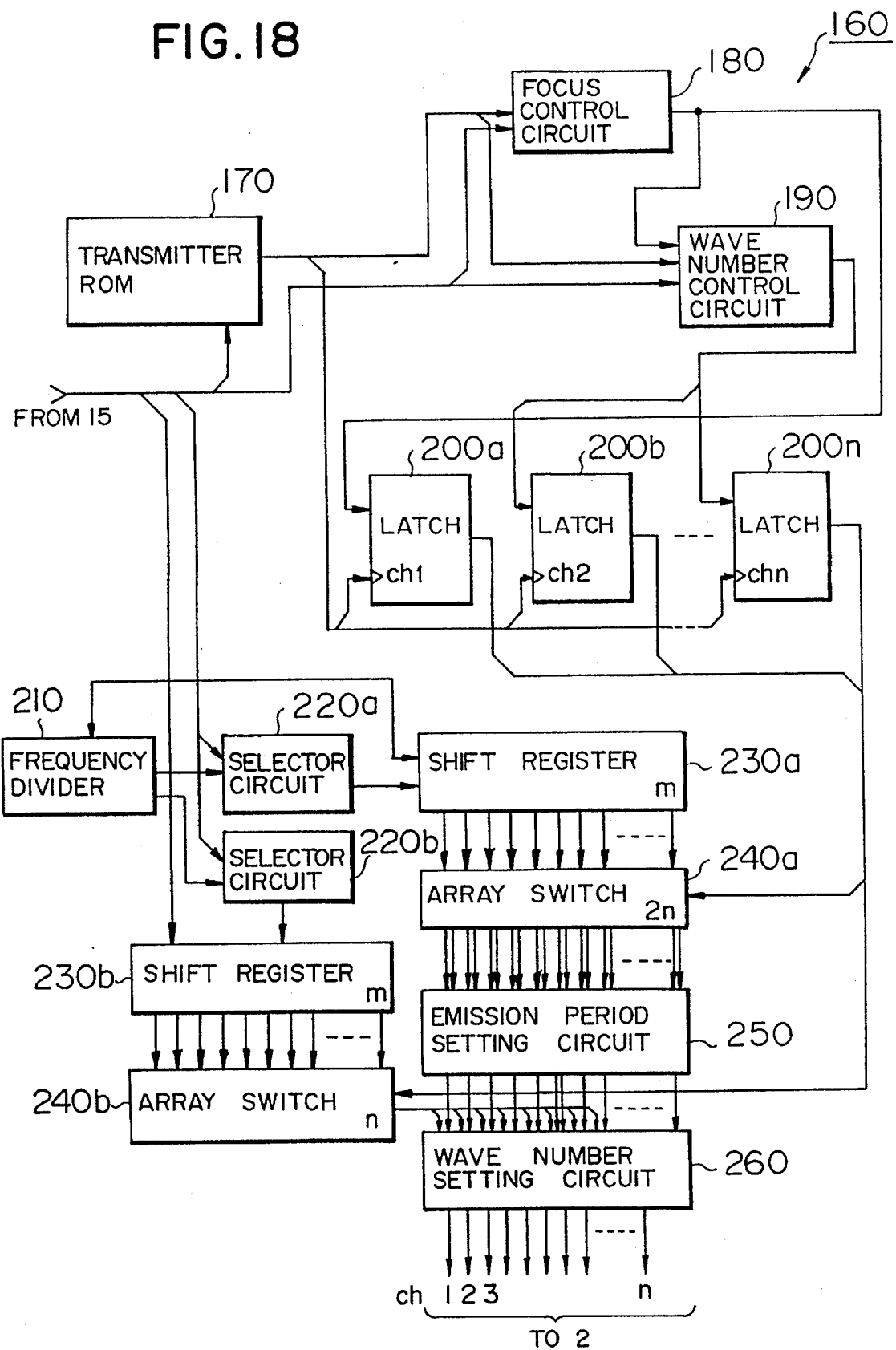
FIG. 18 is a block diagram showing the configuration of a transmitted wave weighting control circuit in FIG. 17.

FIG. 18 shows in detail the configuration of the transmitted wave weighting control circuit 160. As illustrated, the circuit 160 comprises a transmitter ROM 170; a focus control circuit 180; a wave number control circuit 190 serving as a means for changing the wave number of transmitted wave pulses; a plurality of latches $200a$–$200n$; a frequency divider 210; first and second selector circuits $220a$, $220b$; first and second shift registers $230a$, $230b$; first and second array switches $240a$, $240b$; an emission period setting circuit 250; and a wave number setting circuit 260. A transmission control signal outputted from the transmitted wave weighting control circuit 160 is sent to wave transmission drivers 2 of respective channels.

Next, the operation of the ultrasonic diagnostic apparatus thus configured will be explained referring again to FIG. 17. First, the transmitter/receiver 1 is brought into contact with the surface of a body under inspection and started to transmit ultrasonic waves to a region to be diagnosed of the body under inspection. In this event, the scanning ultrasonic waves are controlled by the transmitted wave weighting control circuit 160 so as to form fine beams in the region to be diagnosed. The transmitter/receiver 1 is then supplied with pulses from the wave transmission drivers 2, required to drive respective vibrator elements. The transmitted beams reflected from the organism are received by the transmitter/receiver 1. Received wave signals representing the reflected beams received by the transmitter/receiver 1 are passed through a limiter 4 for restricting unnecessary high voltage components from the wave transmission side, and next amplified by pre-amplifiers 5. Each of the channels including the amplifiers 5 has a predetermined gain and delay time amount. Then, the transmitter/receiver 1 sequentially changes, every predetermined cycle, the direction in which waves are transmitted therefrom and the direction in which reflected waves are received thereby, and repeatedly transmits and receives ultrasonic wave pulses, or transmits continuous ultrasonic waves so as to scan the region to be diagnosed with the ultrasonic waves.

The received wave signals amplified by the respective pre-amplifiers 5 are sequentially inputted to the focusing circuits 6 and the deflection circuit 7. The received wave signal, after subjected to predetermined beam convergence in the focusing circuits 6 and predetermined deflection in the deflection circuit 7, is next processed by the post-processing circuit 8 which performs LOG compress and detects the envelope of the received wave signal. The received wave signal is then converted to a digital signal by the ADC 9 and stored in the buffer memory 10 in an ultrasonic scan line unit. The data in the ultrasonic scan line unit is delivered to the image memory 11, written thereinto, and read therefrom so as to form an ultrasonic wave tomographic image, wherein the wave transmitting and receiving directions are corresponded for each ultrasonic beam. The read data representing the ultrasonic tomographic image is converted to an analog image signal by an internal D/A convertor of the image display circuit 12, which has been adjusted to perform the conversion at the timing required by the display unit 13. The analog image signal is finally displayed on the display unit 13. The controller 15 performs transmission control such as the focusing of transmitted waves, reception control such as the focusing of received waves, and read/write control of the respective memories in conformity to the ultrasonic wave transmitting and receiving timings.

Figure 19:
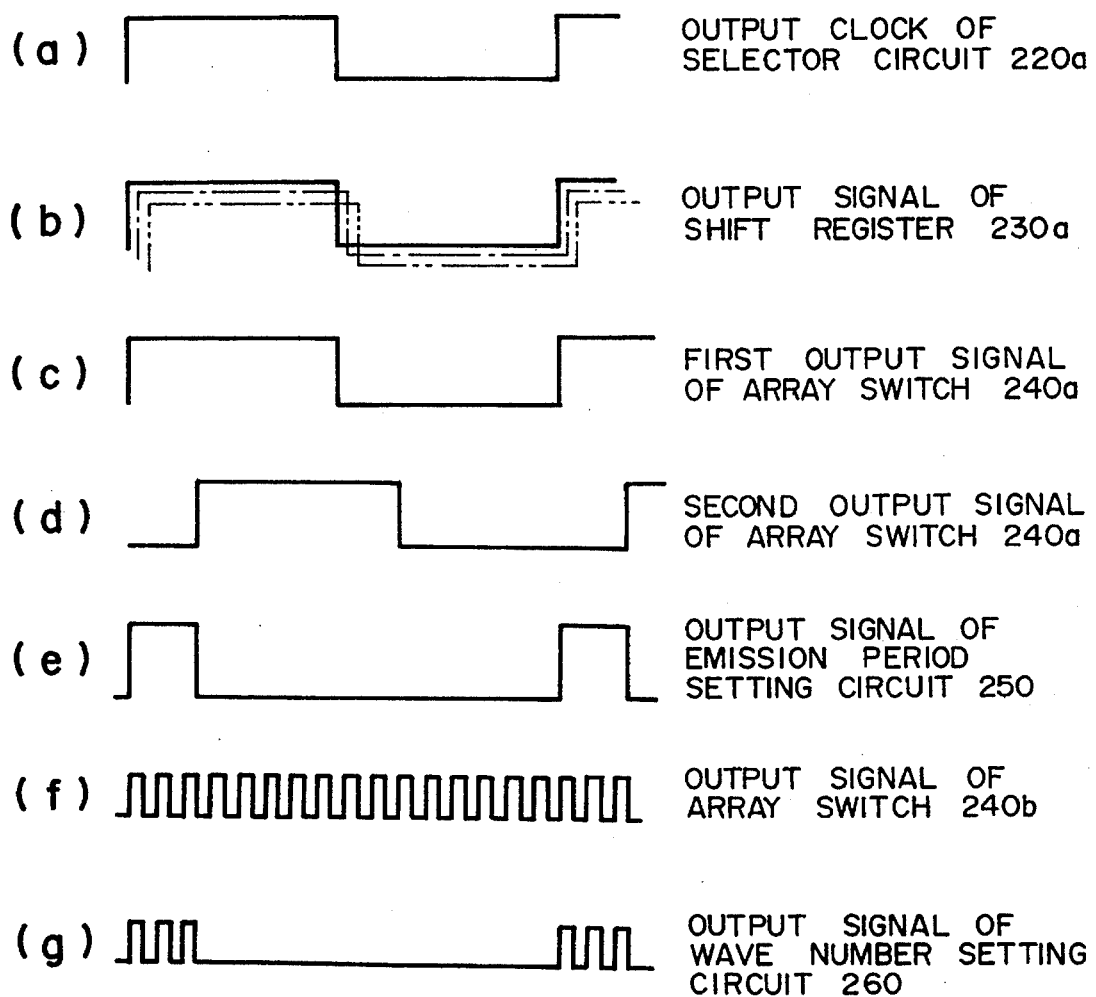
FIG. 19 is a time chart showing the operations of components in the transmitted wave weighting control circuit when the wave number is three.
Figure 20:
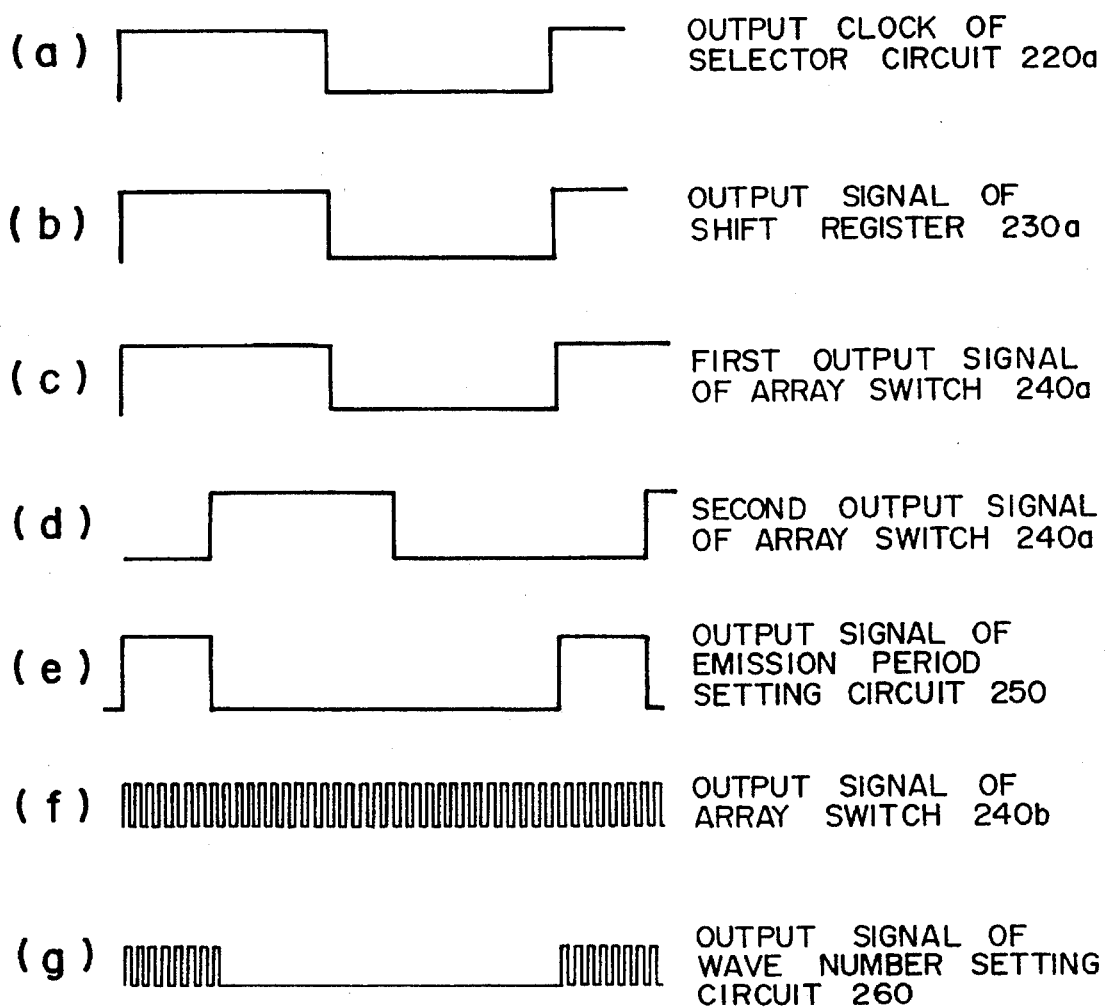
FIG. 20 is a time chart showing the operations of components in the transmitted wave weighting control circuit when the wave number is eight.

Next, the operation of the transmitted wave weighting control circuit 160 will be specifically explained with reference to FIGS. 18–20. First, from focus data and pulse width data stored in the internal transmitter ROM 170 as initial setting, and wave number data previously calculated or obtained by experiment so as to substantially coincide the bearing resolution with the distance resolution, data corresponding to the transmitter/receiver 1 connected to the apparatus as shown in FIG. 17, is read out and sent to the focus control circuit 180 and the wave number control circuit 190. These focus control circuit 180 and wave number control circuit 190 respectively have storage means such as RAM incorporated therein, so that the focus data and the Pulse width data are held in the focus control circuit 180, while the wave number data is held in the wave number control circuit 190.

From the controller 15 shown in FIG. 17, a clock signal is sent to the internal divider 210 and the first and second shift registers 230a, 230b. The cycle of this clock signal defines a minimum unit of delay differences among respective channels which are required to focus transmitted waves. The divider 210 divides the clock signal to generate a signal having a cycle equal to the emission cycle of the transmitted waves. In this event, since the emission cycle may differ depending on a frame rate of an ultrasonic wave image and respective modes such as B mode, PW mode and so on, plural kinds of clock signals are generated and sent to the first selector circuit 220a. The first selector circuit 220a selects by an internal selector a clock signal which complies with a predetermined emission cycle, and sends this selected clock signal to the first shift register 230a (see FIGS. 19(a) and 20(a)). The first shift register 230a outputs m signals to the first array switch 240a. Each of the signals are shifted every check signal which have been sent from the controller 15. The first array switch 240a selects from the output signals of the first shift register 230a 2n signals, having delay differences conforming to the focus data and corresponding to an emission period in which transmitted wave pulses are emitted, by switching signals sent from the plurality of latches 200a–200n for controlling switches in the first array switch 240a. The emission period setting circuit 250 at the next stage is composed of an AND circuit and an invertor, for example, and generates a H (high) signal during an emission period and a L (low) signal during the other period.

The second selector circuit 220b in turn selects a signal having a transmitted pulse width coincident with a desired pulse width from outputs of the divider 210, and sends the selected signal to the second shift register 230b. The second shift register 230b and the second array switch 240b connected thereto operate similarly to the first shift register 230a and the first array switch 240a to set the pulse width of transmitted wave pulses as well as to select n signals so as to provide delay differences conforming to the focus data.

Next, output signals from the second array switch 240b and the emission period setting circuit 250 are inputted to the wave number setting circuit 260, processed thereby, and sent to the wave transmission drivers 2 shown in FIG. 17. The wave number setting circuit 260 is formed of, for example, AND circuits. The above operations, if represented by timing diagrams, may be depicted as shown in FIGS. 19(a)–(g). It can be seen from FIG. 19(g) that, in this example, the number of pulses is determined as "3" by the transmission control signal outputted from the wave number setting circuit 26.

In this state, since the focus control circuit 180 shown in FIG. 18 is supplied with information on delay differences of the respective channels, the emission starting time of each of the channels in the transmitter/receiver 1 can be revealed, for example, based on the emission starting time of the central channel with this emission starting time of each channel, a switch to be selected from the first array switch 240a is determined by the clock cycle of the clock signal from the controller 15 shown in FIG. 17, which represents the minimum unit of delay differences, and a connecting situation of pins between the first shift register 230a and the first array switch 240a. In this way, selection data is found for determining which switch is selected from the first array switch 240a, and sent to odd-numbered channels $ch_1$, $ch_3$, $ch_5$, . . . of the plurality of latches 200a–200n. Next, since the width of the transmitted wave pulse and data on the wave number are stored in the wave number control circuit 190, a period during which waves should be transmitted from the wave transmission starting time can be calculated. Then, from this calculation result, selection data is found for determining which switch is selected from the second array switch 240b. The data thus found is sent to even-numbered channels $ch_2$, $ch_4$, $ch_6$, . . . of the plurality of latches 200a–200n. In this way, by changing the switch selection signals from the plurality of latches 200a–200n, the wave number of transmitted wave pulses can be made variable, as shown in FIG. 20. It can be seen from FIG. 20(g) that, in this example, the number of pulses is determined as "8" by the transmission control signal outputted from the wave number setting circuit 26.

The bearing resolution is improved by the weighting because reduction in deviation of the wavelength $\lambda$ results in reduction due to the wavelength $\lambda$ of a directional function. In addition, if the number of ultrasonic wave pulses is changed by the control, the signal band varies. Thus, the signal band is made wider with a smaller number of pulses, while the signal band is made narrower with a larger number of pulses. Further, with a narrow band, the deviation of the wavelength $\lambda$ is reduced as compared with a wider band. For this reason, the bearing resolution is improved by the control of the wave number of transmitted wave pulses. The distance resolution, on the other hand, depends on the wave number of ultrasonic wave pulses and the wavelength. As the wave number of ultrasonic wave pulses is increased, the distance resolution is degraded. Since the distance resolution is generally better than the bearing resolution, these two resolutions can be made substantially equal by adjusting the wave number of ultrasonic wave pulses. Then, if the bearing resolution becomes substantially equal to the distance resolution, it is possible to eliminate distortions which would otherwise appear on resulting ultrasonic wave images in the bearing direction and the distance direction.

It should be noted that while the foregoing explanation has been made for the case where the wave number of transmitted wave pulses is controlled, the present invention is not limited to this particular example. Alternatively, one of the pulse duty ratio, pulse width, pulse amplitude, and so on or a combination of these factors may be controlled to narrow the signal band. Also, while the weighting of transmitted waves has been described in the foregoing, weighting of received waves or weighting of both transmitted and received waves may also be performed.

Next, a specific experiment example will be explained. Observation conditions are as follows:

| | |
|---|---|
| Object to be observed: | Organism |

| | |
|---|---|
| Center Frequency of Transmitted Waves: | 10 MHz |
| Transmitter: | Linear Type (Model: EUP-L33 manufactured by Hitachi Medical Corporation |
| Focus: | 40 mm |
| Width of Vibrators (Vibrator Pitch): | 0.24 mm |
| Number of Channels: | 64 |
| Number of Transmitted Waves (Number of Pulses): | 8 |
| Weighting Function: | Cosine Function |

Figure 21A:
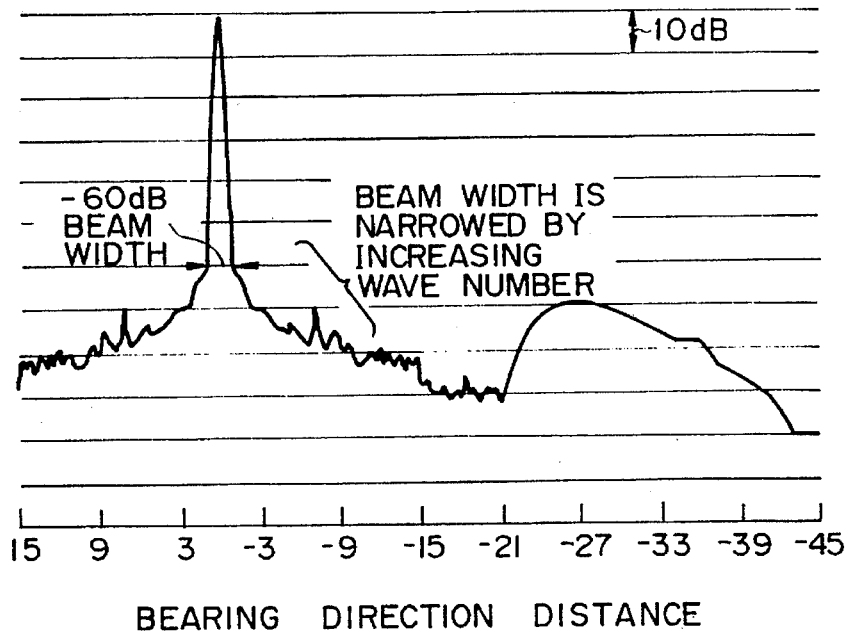
FIG. 21A shows a directional function of an experiment example.

A directional function produced under the above conditions is shown in FIG. 21A. As to the shape of the transmitted ultrasonic waves, see FIG. 22.

Figure 21B:
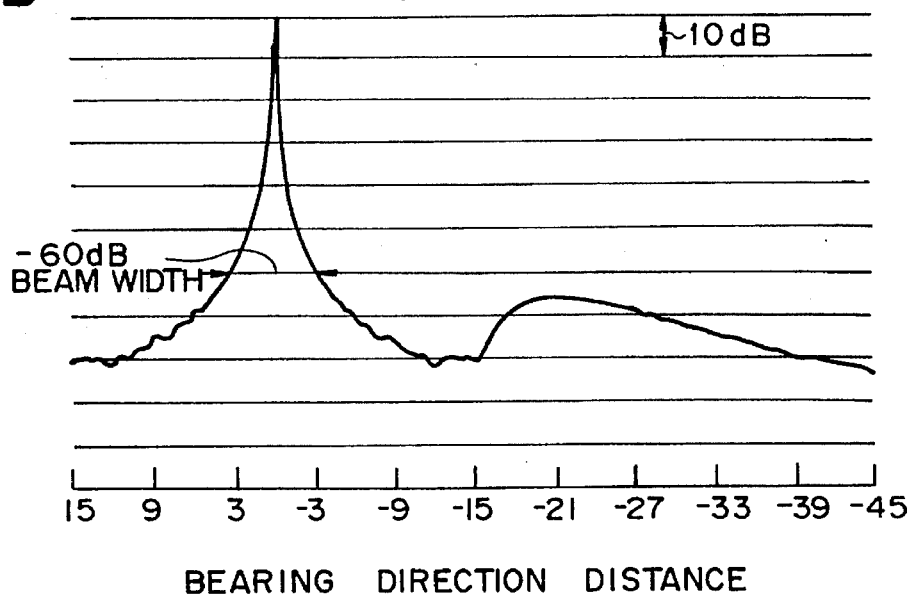

On the other hand, as examples for comparison with the present invention: (1) FIG. 21B shows a directional function which has the wave number set to three and is not weighted; (2) FIG. 21C shows a directional function which has the wave number set to eight, identical to the experiment example, but is not weighted; and (3) FIG. 21D shows a directional function which has the wave number set to three and is weighted. In the respective directional functions, beam widths at a level −60 dB below respective peak values are as shown in FIG. 23. It can be seen that the beam width of the experiment example (FIG. 21A: 2 mm) is approximately one-third that of the comparison examples (FIGS. 21B–21D: 7–6 mm), and the resolution in the bearing direction of the former is increased to approximately three times that of the latter.

Since the wavelength λ of an ultrasonic wave at a frequency of 10 MHz in an organism is approximately equal to 0.15 mm (λ≅0.15), the distance resolutions for the respective numbers of waves are calculated as follows:

Wave Number=8:8×λ≅1.20 mm

Wave Number=3:3×λ≅0.45 mm

From the above values, the ratio of the distance resolution to the bearing resolution is calculated as 2 mm/1.20 mm=1.7 for the experiment example, and as 7 mm/0.45 mm 16 for the comparison examples.

Fifth Embodiment

Figure 24:
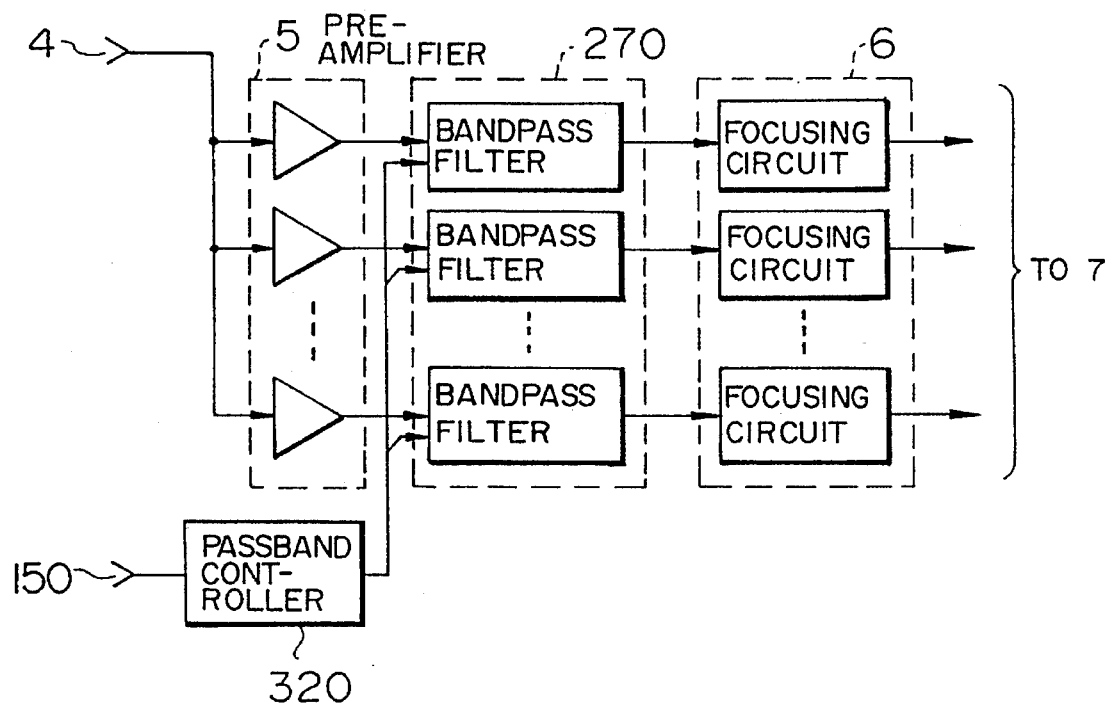
FIG. 24 is a block diagram showing a main portion of an ultrasonic diagnostic apparatus according to a fifth embodiment of the present invention.
Figure 25:
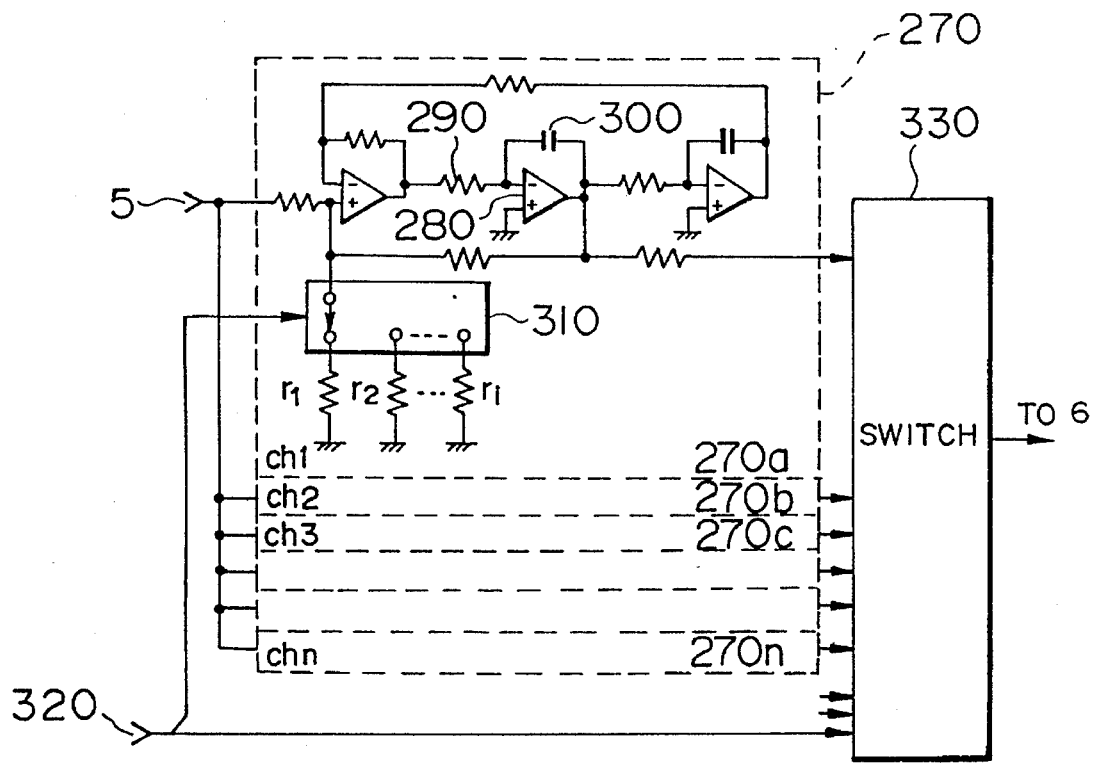
FIG. 25 shows an internal circuit configuration of a channel of a bandpass filter in FIG. 24.

FIG. 24 is a block diagram showing a main portion of a fifth embodiment according to the present invention. This embodiment includes bandpass filters 270 each for limiting the signal band of a received wave signal, while the fourth embodiment narrows the signal band of a transmitted wave signal by making the wave number of transmitted wave pulses variable. Each of the bandpass filter 270 receives a received wave signal after being amplified by a corresponding pre-amplifier 5 and limits the band of the received wave signal. The number of provided bandpass filters 270 is equal to the number of channels of vibrator elements in the transmitter/receiver 1. Outputs signals of the respective bandpass filters 270 are sent to corresponding focusing circuits 6 of the respective channels. On channel portion of the bandpass filter 270 (see reference numeral 270a in FIG. 25) is composed of an operational amplifier 280, a resistor 290, and a capacitor 300, for example, as shown in FIG. 25. In these components, the constants of the resistor 290 and the capacitor 300 may be set such that each bandpass filter 270 passes a signal band equal to that used to determine the wave number in the fourth embodiment.

Figure 26A:
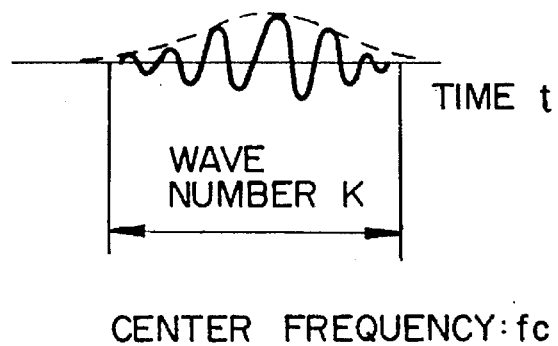
FIG. 26A shows a waveform of an emitted ultrasonic wave.
Figure 26B:
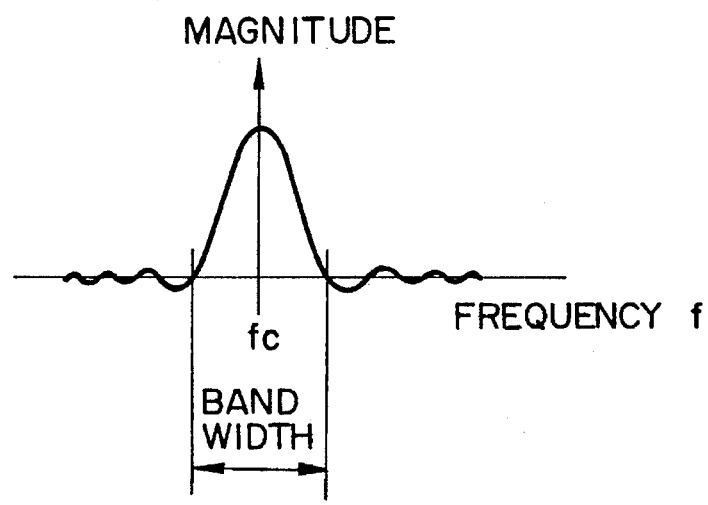
FIG. 26B shows the result of a frequency analysis made on the ultrasonic wave of FIG. 26A.

Specifically, analyzing the frequency of an ultrasonic wave shown in FIG. 26A having the wave number and the center frequency designated K and fc, respectively, and the shape of the envelope being represented by a cosine function (of one cycle), a waveform as shown in FIG. 26B is resulted, and the magnitude of the ultrasonic wave is expressed by the following equation:

$$\text{Magnitude} = \frac{\sin \pi (f - f_c) k/f_c}{\pi (f - f_c) k/f_c} +$$

$$\frac{1}{2} \left\{ \frac{\sin \{\pi (f - f_c - f_c/k) \cdot k/f_c\}}{\pi (f - f_c - f_c/k) k/f_c} + \frac{\sin \{\pi (f - f_c + f_c/k) k/f_c\}}{\pi (f - f_c + f_c/k) k/f_c} \right\}$$

Paying particular attention to a frequency band between first zero points in FIG. 26B, this band width is calculated as 4×10 MHz/8=5 MHz for the fourth embodiment, where the wave number is selected to be eight. Stated another way, in the fourth embodiment, an ultrasonic wave having a band of 5 MHz is transmitted. Therefore, in this embodiment, components at fc±2.5 MHz in a received wave signal are passed, while the remaining components are cut by the bandpass filter, thus producing a similar effect to the fourth embodiment which restricts the wave number of transmitted waves. In the comparison example, where the Wave number is three, the band width is calculated as 4 ×10 MHz/3=13.3 MHz.

Further, while the plurality of other resistors $r_1, r_2, \ldots, r_i$ have different resistance values from each other, the pass band can be varied with the center frequency remaining unchanged by switching these resistors $r_1$–$r_i$ by a selector 310.

To the bandpass filter 270 connected is a passband controller 320, as shown in FIG. 24. This passband controller 320, which controls the passband of the bandpass filter 270, has incorporated therein a storage means for storing passband data calculated or derived by experiment; another storage means for storing a table indicating the relationship between passband data calculated from the passband of the filter 270 defined by a circuit constant thereof and data selected by the selector 310 shown in FIG. 25; and a comparator circuit for comparing the passband data respectively read from these two storage means to see whether or not they coincide with each other, though the illustration of these components is omitted in FIG. 24. With this configuration, the passband controller 270 sends a selection signal to the selector 310 only when a desired band is indicated.

The operation of the fifth embodiment configured as described above will be next explained with reference to FIG. 24. First, outputs of the limiter 4 are sent to the respective pre-amplifiers 5 and weighted by them similarly to the fourth embodiment. Next, outputs of the respective pre-amplifiers 5 are inputted to the corresponding bandpass filters 270 which limit the passbands of the respective input signals. Then, outputs of the respective bandpass filters 270 are inputted to the corresponding focusing circuits 6 to be focused, and outputted to the deflection circuit 7 at the next stage. It should be noted that while the bandpass filters 270 are shown in FIG. 24 as inserted behind the pre-amplifiers 5, the present embodiment is not limited to this particular configuration. Alternatively, the bandpass filters 270 may be disposed behind the focusing circuits 6 such that they are supplied with signals to which several channels are added by the focusing circuits 6. If digital circuits are employed for the focusing circuits 6 and the deflection circuit 7, digital operations may only be performed corresponding to the above-mentioned filter processing.

Further, the means for adjusting the signal band of a transmitted wave signal or a received wave signal may include a plurality of adjusting elements having different adjusting conditions from each other and a switching means for switching an appropriate adjusting condition for a signal band in accordance with the type of a used transmitter/receiver 1. For example, in the fifth embodiment shown in FIG. 24, a plurality of different bandpass filters 270 having different adjusting conditions may be provided as a means for adjusting the signal band of a received wave signal, and a switch 330 may be provided common to the plurality of bandpass filters 270, as shown in FIG. 25, such that the bandpass filters 270 are switched in accordance with the type of a transmitter/receiver 1 selected from a plurality of different types of transmitters. Further, alternative to the foregoing example, a plurality of transmitted wave weighting control circuits 160 may be provided in the fourth embodiment as a means for adjusting the signal band of a transmitted wave signal, such that they are switched by a switch 330 similar to that shown in FIG. 25 in accordance with the type of a transmitter/receiver 1 selected from a plurality of different types of transmitters.

Although the illustration is omitted, an input device such as a rotary switch may be connected to the controller 15 so as to allow the operator to arbitrarily adjust the bearing resolution and the distance resolution by operating the input device to control the adjusting means 160, 270 for adjusting the signal band of ultrasonic transmitted or received wave signals in order to make the bearing resolution of a produced ultrasonic image substantially equal to the distance resolution of the same.

According to the fifth embodiment configured as described above, a means for adjusting the signal band of ultrasonic transmitted or received wave signals is provided to make the bearing resolution of a produced ultrasonic image substantially equal to the distance resolution of the same, thus eliminating distortions in the resulting ultrasonic image. In this way, it is possible to prevent only the bearing resolution from being improved without considering the balance between the bearing resolution and the distance resolution, as has been the case in the prior art. Therefore, distortions are eliminated from displayed images, so that a circular point, for example, can be displayed as a circular point image on the screen, thus making it possible to correctly recognize a situation of a diagnosed region.

While the present invention has been described in detail, it should be understood that various changes, substitutions and alternations can be made hereto without departing from the spirit and scope of the present invention as defined by the appended claims.

What is claimed is:

1. An ultrasonic diagnostic apparatus comprising:
    transmission means for transmitting ultrasonic waves into a body under inspection;
    means for receiving said ultrasonic waves reflected from a region to be diagnosed in said body under inspection to form a received wave signal;
    means for processing said received wave signal to form an image;
    means for preserving a weighting function;
    means for changing said weighting function with reference to the magnitude of said received wave signal; and
    means for weighting at least one of the amplitude of said transmitted ultrasonic waves and the amplitude of said received wave signal based on said changed weighting function.

2. An ultrasonic diagnostic apparatus according to claim 1, wherein the luminance of said image is used to represent the magnitude of said received wave signal.

3. A ultrasonic diagnostic apparatus according to claim 1, wherein said means for changing a weighting function outputs a weighting function which increases a difference between a peak value and a minimum value of a directional function when side lobes of said received wave signal are larger than a predetermined limit, and outputs a weighting function which reduces said difference between the peak value and the minimum value when the side lobes of said received wave signal are smaller than the predetermined limit.

4. An ultrasonic diagnostic apparatus according to claim 1, further comprising means for setting a range of the received wave signal to be referenced.

5. An ultrasonic diagnosing method comprising the steps of:
    transmitting ultrasonic waves into a body under inspection;
    receiving said ultrasonic waves reflected from a region to be diagnosed in said body under inspection to form a received wave signal;
    processing said received wave signal to form an image;
    selecting a weighting function with reference to the magnitude of said received wave signal; and
    weighting at least one of the amplitude of said transmitted ultrasonic waves and the amplitude of said received wave signal based on said selected weighting function.

6. An ultrasonic diagnostic apparatus comprising:
    transmission means for transmitting ultrasonic waves into a body under inspection;
    means for receiving said ultrasonic waves reflected from a region to be diagnosed in said body under inspection to form a received wave signal;
    means for processing said received wave signal to form an image;
    means for preserving weighting functions;
    means for weighting at least one of the amplitude of said transmitted ultrasonic waves and the amplitude of said received wave signal based on a weighting function selected from said preserved weighting functions; and
    adjusting means for making a bearing resolution of said image substantially equal to a distance resolution of said image.

7. An ultrasonic diagnostic apparatus according to claim 6, wherein said adjusting means adjusts the wave number of the ultrasonic wave to be transmitted.

8. An ultrasonic diagnostic apparatus according to claim 7, wherein the wave number of said ultrasonic wave ranges from five to ten.

9. An ultrasonic diagnostic apparatus according to claim 7, wherein the wave number of said ultrasonic wave ranges from six to eight.

10. An ultrasonic diagnostic apparatus according to claim 6, wherein said adjusting means restricts a frequency band of said ultrasonic waves to be transmitted.

11. An ultrasonic diagnostic apparatus according to claim 6, wherein said adjusting means restricts a frequency band of said received wave signal.

12. An ultrasonic diagnostic apparatus according to claim 11, wherein said adjusting means includes at least one filter for restricting a frequency range to pass said received wave signal within said restricted frequency range.

13. An ultrasonic diagnostic apparatus according to claim 7, wherein said transmission means includes a transmitter, and said adjusting means includes means for changing the wave number of the ultrasonic wave in accordance with the type of said transmitter.

14. An ultrasonic diagnostic apparatus according to claim 12, wherein said transmission means includes a transmitter, and said adjusting means includes a plurality of filters respectively having different frequency bands through which said received wave signal is passed, and means for selecting one from said plurality of filters which matches with the type of said transmitter.

15. An ultrasonic diagnostic apparatus according to claim 7, further comprising means for changing said weighting function with reference to the magnitude of said received wave signal.

16. An ultrasonic diagnostic apparatus according to claim 11, further comprising means for changing said weighting function with reference to the magnitude of said received wave signal.

17. An ultrasonic diagnosing method comprising the steps of:

transmitting ultrasonic waves into a body under inspection;

receiving said ultrasonic waves reflected from a region to be diagnosed in said body under inspection to form a received wave signal;

means for processing said received wave signal to form an image;

weighting at least one of the amplitude of said transmitted ultrasonic waves and the amplitude of said received wave signal based on a previously given weighting function; and making a bearing resolution of said image substantially equal to a distance resolution of said image.

\* \* \* \* \*